United States Patent
Tamshe et al.

(10) Patent No.: US 12,522,389 B2
(45) Date of Patent: Jan. 13, 2026

(54) AUTOMATIC FOOD PRODUCT FILLING DEVICE

(71) Applicant: PACKLINE USA, LLC, Rancho Cucamonga, CA (US)

(72) Inventors: Amir Tamshe, Rancho Cucamonga, CA (US); Victor Katseli, Holon (IL)

(73) Assignee: PACKLINE USA, LLC, Rancho Cucamonga, CA (US)

( * ) Notice: Subject to any disclaimer, the term of this patent is extended or adjusted under 35 U.S.C. 154(b) by 398 days.

(21) Appl. No.: 18/207,301

(22) Filed: Jun. 8, 2023

(65) Prior Publication Data

US 2024/0409251 A1 Dec. 12, 2024

(51) Int. Cl.
*B65B 3/12* (2006.01)
*B65B 1/38* (2006.01)
*B65B 3/32* (2006.01)

(52) U.S. Cl.
CPC ............. *B65B 3/12* (2013.01); *B65B 1/38* (2013.01); *B65B 3/326* (2013.01); *B65B 2220/14* (2013.01)

(58) Field of Classification Search
CPC .. B65B 1/38; B65B 3/12; B65B 3/326; B65B 2220/14
See application file for complete search history.

(56) References Cited

U.S. PATENT DOCUMENTS

| | | | | |
|---|---|---|---|---|
| 3,580,302 A * | 5/1971 | Riesenberg | ............ | B67C 3/246 222/168.5 |
| 3,731,715 A * | 5/1973 | Gageant | ............ | B65B 3/323 141/146 |
| 4,878,760 A * | 11/1989 | Newton | ............ | G07F 13/065 366/196 |
| 5,052,591 A * | 10/1991 | Divall | ............ | B65B 3/326 137/625.48 |
| 5,197,376 A * | 3/1993 | Bird | ............ | A47J 37/1228 99/330 |
| 5,344,052 A * | 9/1994 | Divall | ............ | B65B 39/004 222/145.2 |
| 5,996,652 A * | 12/1999 | Schromm | ............ | B65B 3/326 141/105 |
| 6,526,908 B2 * | 3/2003 | Gardner | ............ | A21C 9/04 118/313 |
| 6,793,387 B1 * | 9/2004 | Neas | ............ | B01F 33/841 222/106 |
| 7,357,280 B2 * | 4/2008 | Nishinomiya | ............ | A23G 3/021 222/278 |

(Continued)

FOREIGN PATENT DOCUMENTS

EP 3650359 B1 * 1/2022 ............. B65B 25/02

*Primary Examiner* — Nicolas A Arnett
(74) *Attorney, Agent, or Firm* — Sughrue Mion, PLLC

(57) ABSTRACT

Systems and methods for automatic filling of packaging with a food product that includes both a solid and a liquid are provided. A filling device includes: a vessel configured to hold the food product; a first piston system configured to push a portion of the food product within the vessel through a first through hole in a bottom of the vessel. The first piston system includes: a first piston; and a first sleeve that surrounds at least a portion of the first piston. The filling device further includes first actuators configured to independently actuate the first piston and the first sleeve such as to cause the portion of the food product to be pushed through the first through hole in the vessel.

20 Claims, 23 Drawing Sheets

(56) References Cited

U.S. PATENT DOCUMENTS

| | | | | |
|---|---|---|---|---|
| 9,505,506 B2* | 11/2016 | Ammann | .................. | B65B 3/36 |
| 10,899,481 B2* | 1/2021 | Moreau | .................... | B65D 3/00 |
| 11,311,031 B2* | 4/2022 | Jensen | .................. | A23K 40/00 |
| 11,332,267 B2* | 5/2022 | Bischoff | .................. | B65B 1/10 |
| 11,884,430 B2* | 1/2024 | Roig | ..................... | B65B 39/001 |
| 2011/0163121 A1* | 7/2011 | Katseli | ................. | G01F 11/021 |
| | | | | 141/85 |
| 2016/0341588 A1* | 11/2016 | Marchadour | ............ | F16M 1/00 |

* cited by examiner

AUTOMATIC FOOD PRODUCT FILLING DEVICE

BACKGROUND

1. Technical Field

Embodiments of the present disclosure are directed to systems for automatic filling of packaging with a food product that includes both a solid and a liquid.

2. Background of Related Art

In the related art, food product filling devices are used to fill, in one step, packaging with a non-homogenized food product. However, the food product filling devices of the related art fill the packaging with a food product that is only one from among a solid and a liquid, and were not able to fill the packaging with a proper mixture of a solid and a liquid constituting other food products. Such other food products may include, for example, the solid in a larger volume than the liquid.

Accordingly, in the related art, in order to fill packaging with a food product that is constituted by both a solid and a liquid, the packaging would first be filled with the solid (e.g., by a scale or auger), and then filled with the liquid in a separate step. However, such a process has, for example, the problems of being labor intensive and very costly to perform. Additionally, such a process was unsuitable in a case where the packaging was to be filled with a solid and liquid, constituting a food product, that has a high temperature.

Accordingly, there is a need for an automatic food product device that can, for example, fill packaging with a proper mixture of a food product that includes both a solid and a liquid.

SUMMARY

Embodiments of the present disclosure may include an automatic food product device (e.g., a filling device) that can fill packaging with a proper mixture of a food product that includes both a solid and a liquid.

Embodiments of the present disclosure may enable automatic filling of a food product that includes two kinds of product (e.g., a solid and a liquid) that cannot be homogenized and/or blended.

According to embodiments of the present disclosure, the food product may include, for example, about 10% weight to about 90% weight of the solid when a total weight of the solid and liquid portions of the food product is considered to be 100% weight.

According to embodiments of the present disclosure, the food product intended to be filled by the filling device is not particularly limited, and such food products having a combination of solid and liquid are well known in the art, such as, for example, a pico de gallo.

According to embodiments of the present disclosure, a filling device for filling packaging with a food product that includes a mixture of a solid and a liquid is provided. The filling device may include, for example: a vessel configured to hold the food product; a first piston system configured to push a portion of the food product within the vessel through a first through hole in a bottom of the vessel. The first piston system may include, for example: a first piston; and a first sleeve that surrounds at least a portion of the first piston. The filling device may further include, for example, first actuators configured to independently actuate the first piston and the first sleeve such as to cause the portion of the food product to be pushed through the first through hole in the vessel.

According to one or more embodiments of the present disclosure, the first piston may be directly above the first through hole and configured to be actuated into the first through hole.

According to one or more embodiments of the present disclosure, the filling device may further include a first valve that is attached to the vessel such as to be communication with the first through hole of the vessel, the first valve configured to be selectively opened and closed to allow and disallow the food product from exiting the vessel at the bottom of the vessel.

According to one or more embodiments of the present disclosure, the first valve may include, for example: a filling nozzle that is configured to receive the food product: at least one body that is configured to open and close an opening in the filling nozzle; and at least one actuator configured to actuate the at least one body.

According to one or more embodiments of the present disclosure, the first piston may be directly above the filling nozzle and configured to be actuated into the filling nozzle.

According to one or more embodiments of the present disclosure, the first sleeve may be, for example, a cylinder.

According to one or more embodiments of the present disclosure, the filling device may further include, for example: a second piston system configured to push another portion of the food product within the vessel through a second through hole in the bottom of the vessel, the second piston system including: a second piston; and a second sleeve that surrounds at least a portion of the second piston, wherein the first actuators are configured to independently actuate the second piston and the second sleeve such as to cause the other portion of the food product to be pushed through the second through hole in the vessel.

According to one or more embodiments of the present disclosure, the first actuators may include, for example: a piston actuator configured to simultaneously actuate both of the first piston and the second piston in a vertical direction; and a sleeve actuator configured to simultaneously actuate both of the first sleeve and the second sleeve in the vertical direction.

According to embodiments of the present disclosure, a filling system may include, for example: the filling device; and a controller configured to: control the first piston to move downwards from a raised position to a first lowered position; control, while the first piston is at or moving towards the first lowered position, the first sleeve to move downwards from the raised position to a second lowered position that is lower than the first lowered position; and control, while the first sleeve is at the second lowered position, the first piston to move to a third lowered position that is equal to or lower than the second lowered position, wherein a combination of the first piston at the first lowered position and the first sleeve at the second lowered position defines a predetermined volume that corresponds to a volume of the food product to be filled into the packaging.

According to one or more embodiments of the present disclosure, at the second lowered position, a bottom end of the first sleeve may be adjacent to a floor of the vessel, and at the third lowered position, a bottom end of the first piston may be below the first through hole.

According to one or more embodiments of the present disclosure, the filling device may further include, for example, a first valve that is attached to the vessel such as to be communication with the first through hole of the vessel, the first valve configured to be selectively opened to allow and disallow the food product from exiting the vessel at the bottom of the vessel, and the controller is further configured to control the first valve to open while the first sleeve is at the second lowered position and before the first piston is at the third lowered position.

According to one or more embodiments of the present disclosure, at the second lowered position, the bottom end of the first sleeve may be adjacent to a floor of the vessel, and at the third lowered position, the bottom end of the first piston may be adjacent to or below a bottom end of a filling nozzle of the first valve.

According to one or more embodiments of the present disclosure, the controller may be further configured to: control, after the first piston has reached the third lowered position, the first piston to move upwards out of the first valve; and control, after the first piston has moved out of the first valve, the first valve to close.

According to one or more embodiments of the present disclosure, the filling system may, for example, further include a conveyor configured to move packaging to a position below the vessel to receive the food product.

According to embodiments of the present disclosure, the food product in the vessel may, for example, be a substantially non-homogenous mixture of the solid and liquid components, and the food product pushed into the packaging is the same or substantially the same non-homogenous mixture of the solid and liquid components as in the vessel.

According to embodiments of the present disclosure, the food product in the vessel has a weight ratio of solid to liquid of about 10:90 to about 90:10, and the food product pushed into the packaging has the same or substantially the same weight ratio as the food product in the vessel.

According to embodiments of the present disclosure, a method is provided. The method may include, for example: controlling a scraper, that is within a vessel, to mix food product within the vessel, the food product including a solid and a liquid; and causing a portion of the food product to be pushed through a through hole in the vessel and into packaging, wherein the causing the portion of the food product to be pushed includes: controlling a piston to move downwards from a raised position to a first lowered position within the vessel: control, while the piston is at or moving towards the first lowered position, a sleeve that at least partially surrounds the piston to move downwards from the raised position to a second lowered position that is lower than the first lowered position. The method may, for example, further include controlling, while the sleeve is at the second lowered position, the piston to move to a third lowered position that is equal to or lower than the second lowered position, such as to push the food product into the packaging, wherein a combination of the first piston at the first lowered position and the first sleeve at the second lowered position defines a predetermined volume that corresponds to a volume of the food product to be filled into the packaging.

According to one or more embodiments of the present disclosure, at the second lowered position, a bottom end of the sleeve is adjacent to a floor of the vessel, and at the third lowered position, a bottom end of the piston is below the through hole.

According to one or more embodiments of the present disclosure, a valve may be attached to the vessel such as to be communication with the through hole of the vessel, the valve configured to be selectively opened and closed to allow and disallow the food product from exiting the vessel at the bottom of the vessel, and the causing the portion of the food product to be pushed further includes controlling the valve to open while the sleeve is at the second lowered position and before the piston is at the third lowered position.

According to one or more embodiments of the present disclosure, at the second lowered position, the bottom end of the sleeve may be adjacent to a floor of the vessel, and at the third lowered position, the bottom end of the piston may be adjacent to or below a bottom end of a filling nozzle of the valve.

According to one or more embodiments of the present disclosure, the causing the portion of the food product to be pushed may further include: controlling, after the piston has reached the third lowered position, the piston to move upwards out of the valve; and controlling, after the piston has moved out of the valve, the valve to close.

According to one or more embodiments of the present disclosure, the method may further include controlling a scraper, that is within the vessel, to move the food product towards the through hole.

According to one or more embodiments of the present disclosure, the controlling the scraper may, for example, include controlling the scraper to rotate within the vessel, and at the third lowered position, a bottom end of the piston is below the scraper.

Additional features and advantages of the present disclosure are described further below. This summary section is meant merely to illustrate certain features of the disclosure, and is not meant to limit the scope of the disclosure in any way. The failure to discuss a specific feature or embodiment of the disclosure, or the inclusion of one or more features in this summary section, should not be construed to limit the claims

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
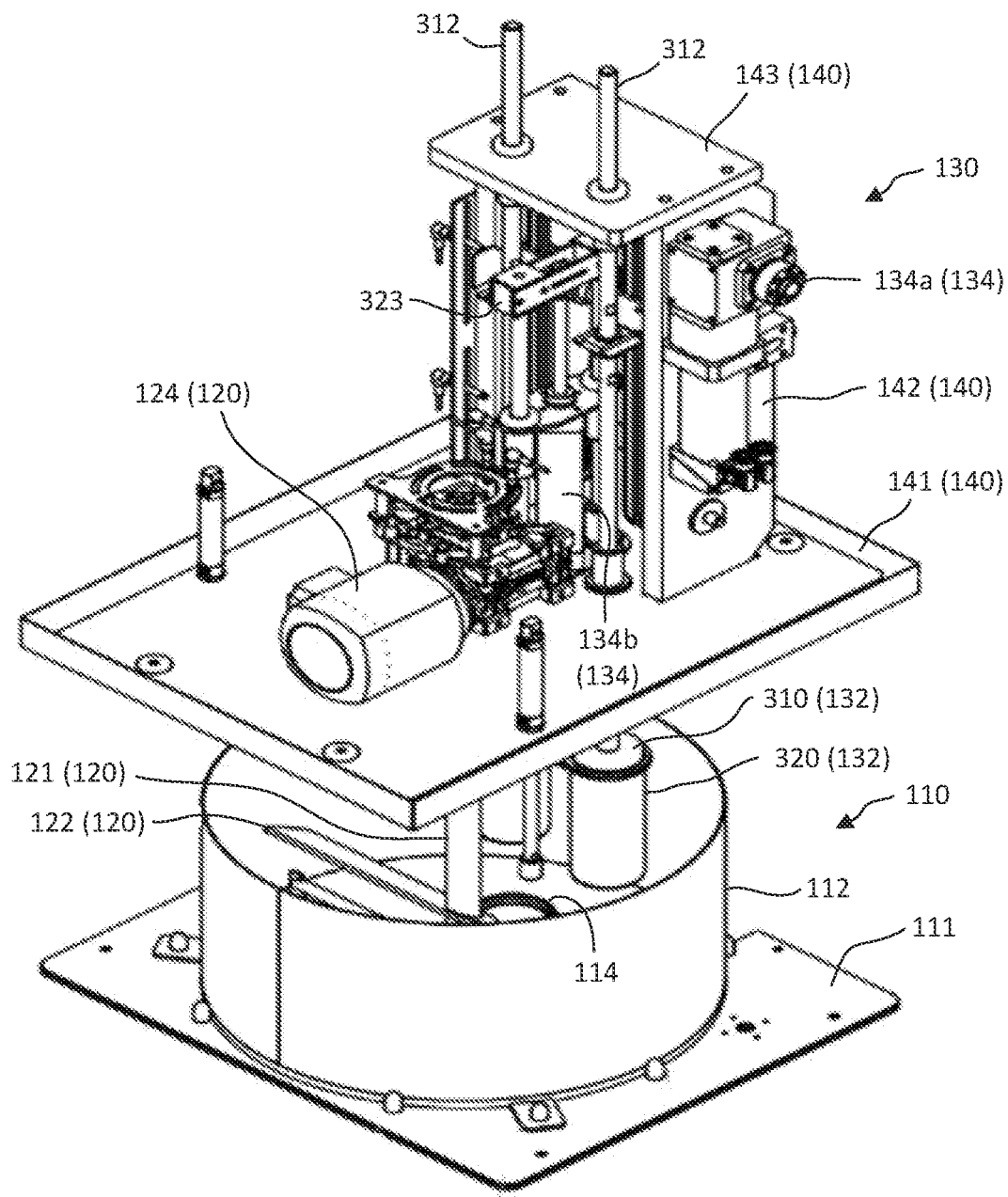
FIG. 1 is a diagram illustrating a perspective view of a filling device according to an embodiment of the present disclosure.

Reference will now be made in detail to example embodiments of the present disclosure, further examples of which are illustrated in the accompanying drawings. In the accompanying drawings, shapes, sizes, and the like of some components may be exaggerated or simplified for clarity.

It is to be understood that the terminology used herein is for purposes of describing particular example embodiments only, and is not intended to be limiting.

As used in this specification and the appended claims, the singular forms "a," "an," and "the" include plural references unless the context clearly dictates otherwise.

Any range will be understood to encompass and be a disclosure of each discrete point and subrange within the range. Stated differently, the ranges in the present disclosure are equivalent to a subset of the unwieldy and lengthy description of every possible combination of these discrete values, presented in an easily understood shorthand format (i.e., a range).

As used herein, "about," "approximately," "substantially," and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term, and "substantially" and "significantly" will mean plus or minus >10% of the particular term.

In the following description, the same or similar reference characters may be used for the same or similar components in the drawings, and redundant descriptions thereof may be omitted.

With reference to FIGS. 1-9, filling devices according to embodiments of the present disclosure are described below.

Figure 2:
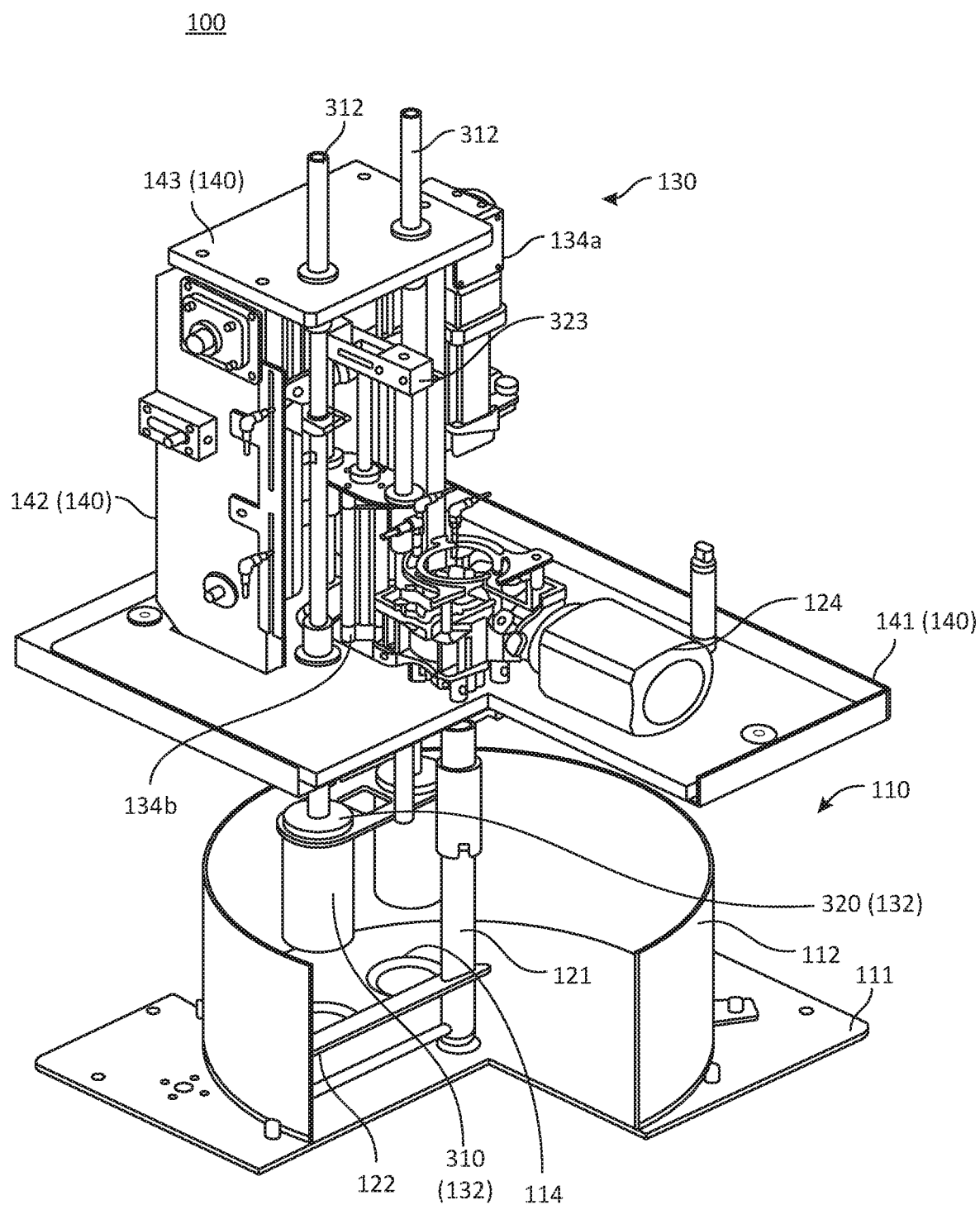
FIG. 2 is a diagram illustrating a half sectional, perspective view of the filling device illustrated in FIG. 1.

FIG. 1 is a diagram illustrating a perspective view of a filling device 100 according to an embodiment of the present disclosure. FIG. 2 is a diagram illustrating a half sectional, perspective view of the filling device 100 illustrated in FIG. 1.

Figure 3:
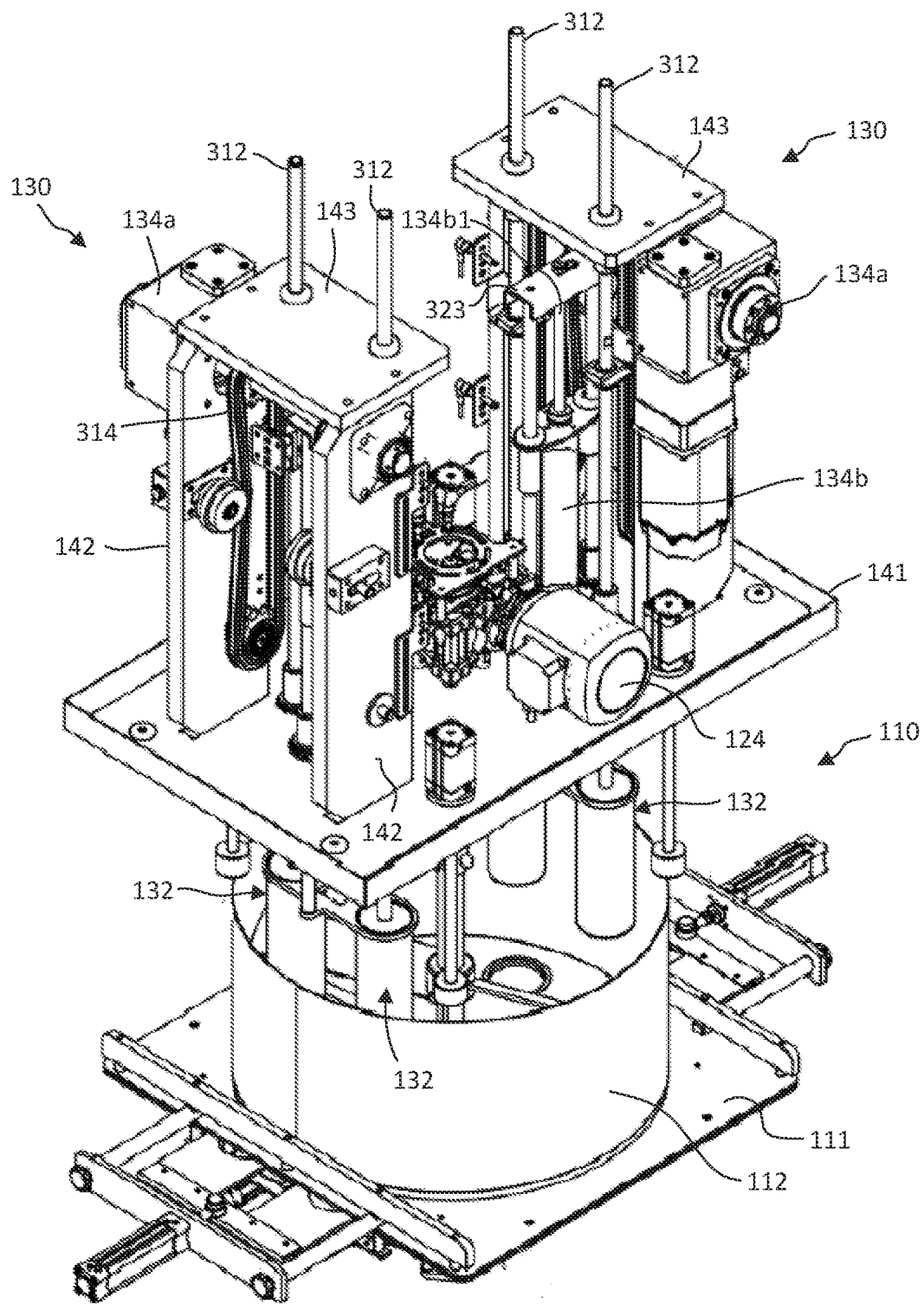
FIG. 3 is a diagram illustrating a perspective view of a filling device according to an embodiment of the present disclosure.
Figure 4:
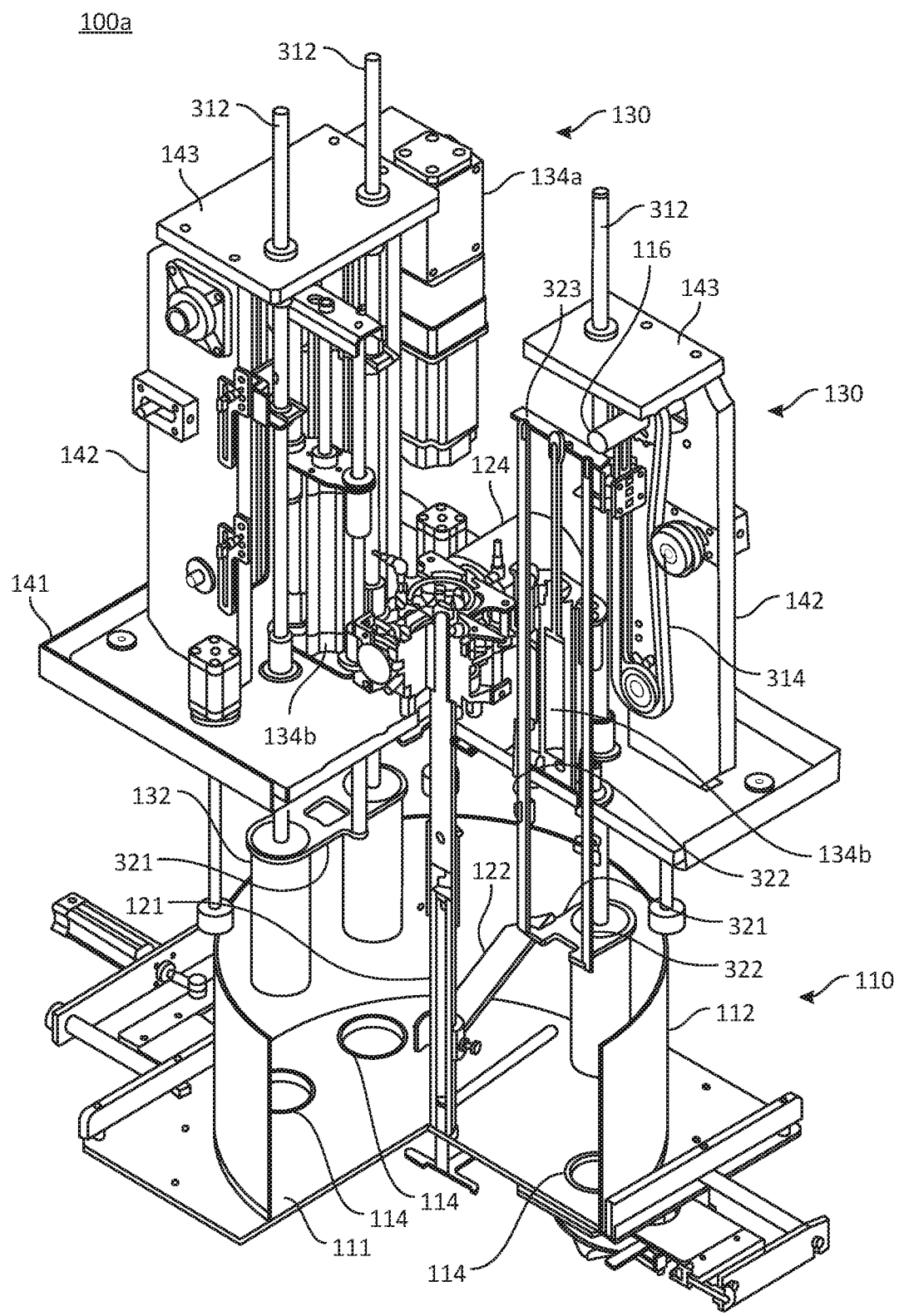
FIG. 4 is a diagram illustrating a half sectional, perspective view of the filling device illustrated in FIG. 3.
Figure 5:
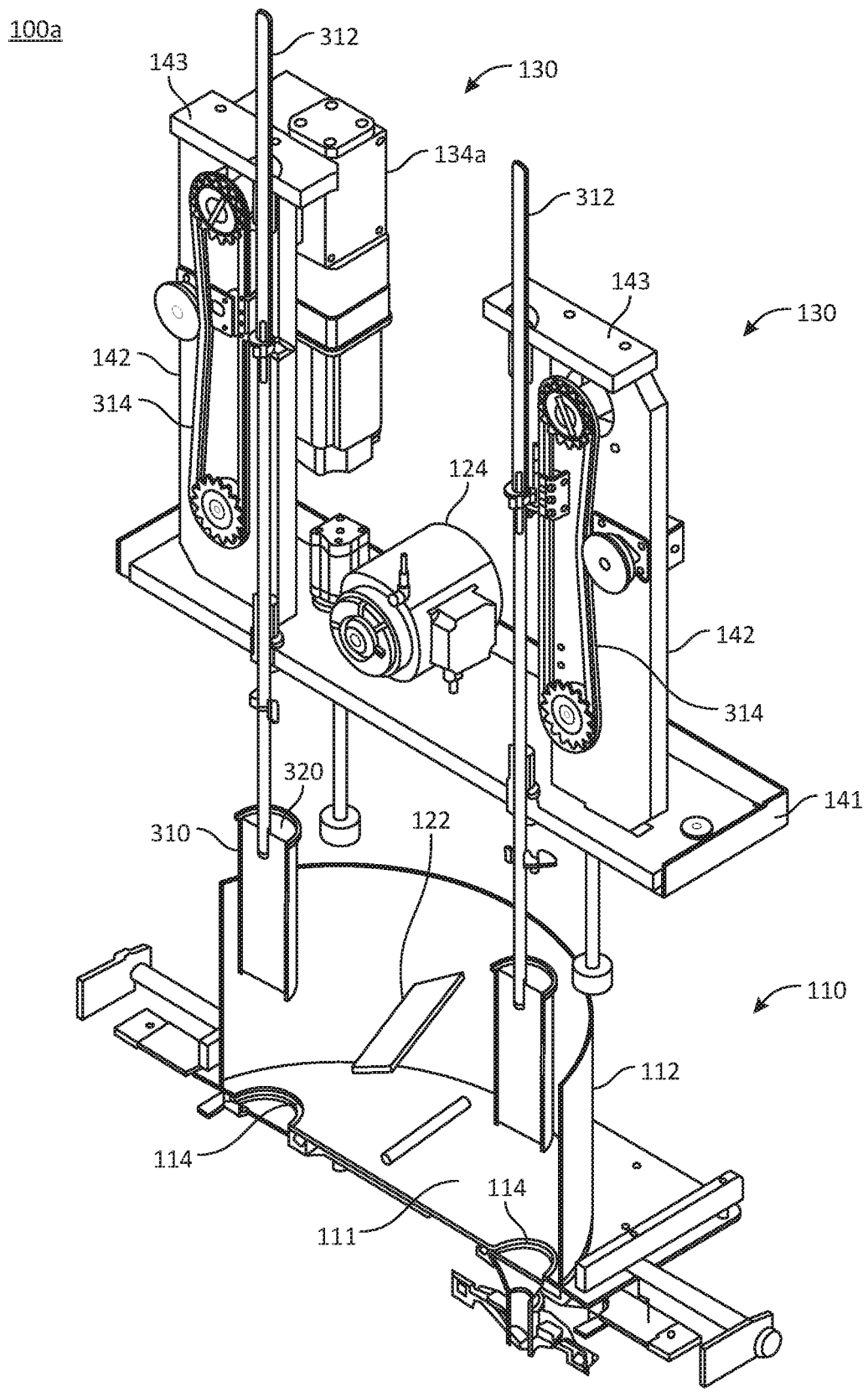
FIG. 5 is a diagram illustrating a sectional, perspective view of the filling device illustrated in FIG. 3.
Figure 6:
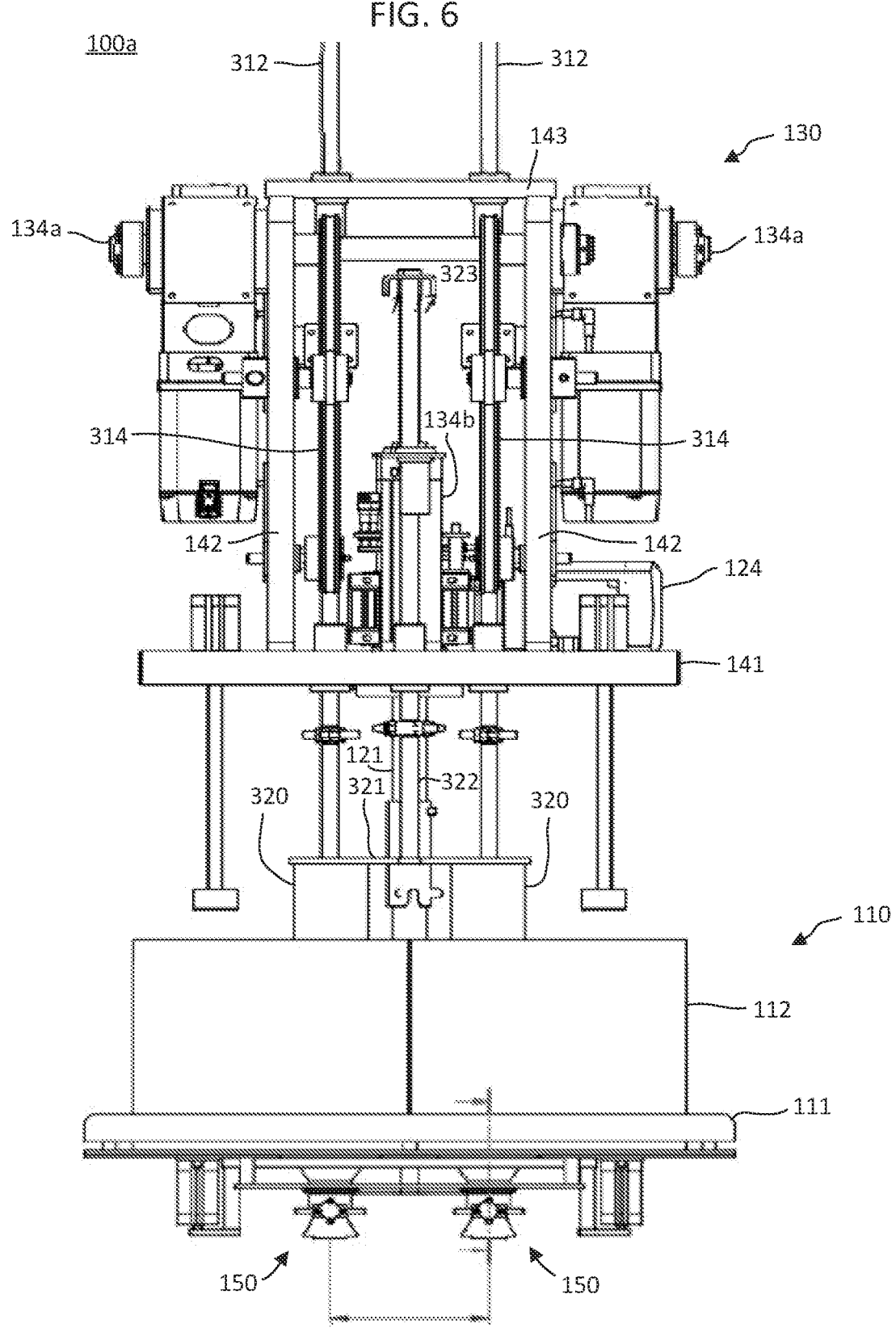
FIG. 6 is a diagram illustrating a side view of the filling device illustrated in FIG. 3.

FIG. 3 is a diagram illustrating a perspective view of a filling device 100a according to an embodiment of the present disclosure. FIG. 4 is a diagram illustrating a half sectional, perspective view of the filling device 100a illustrated in FIG. 3. FIG. 5 is a diagram illustrating a sectional, perspective view of the filling device 100a illustrated in FIG. 3. FIG. 6 is a diagram illustrating a side view of the filling device 100a illustrated in FIG. 3.

Figure 7:
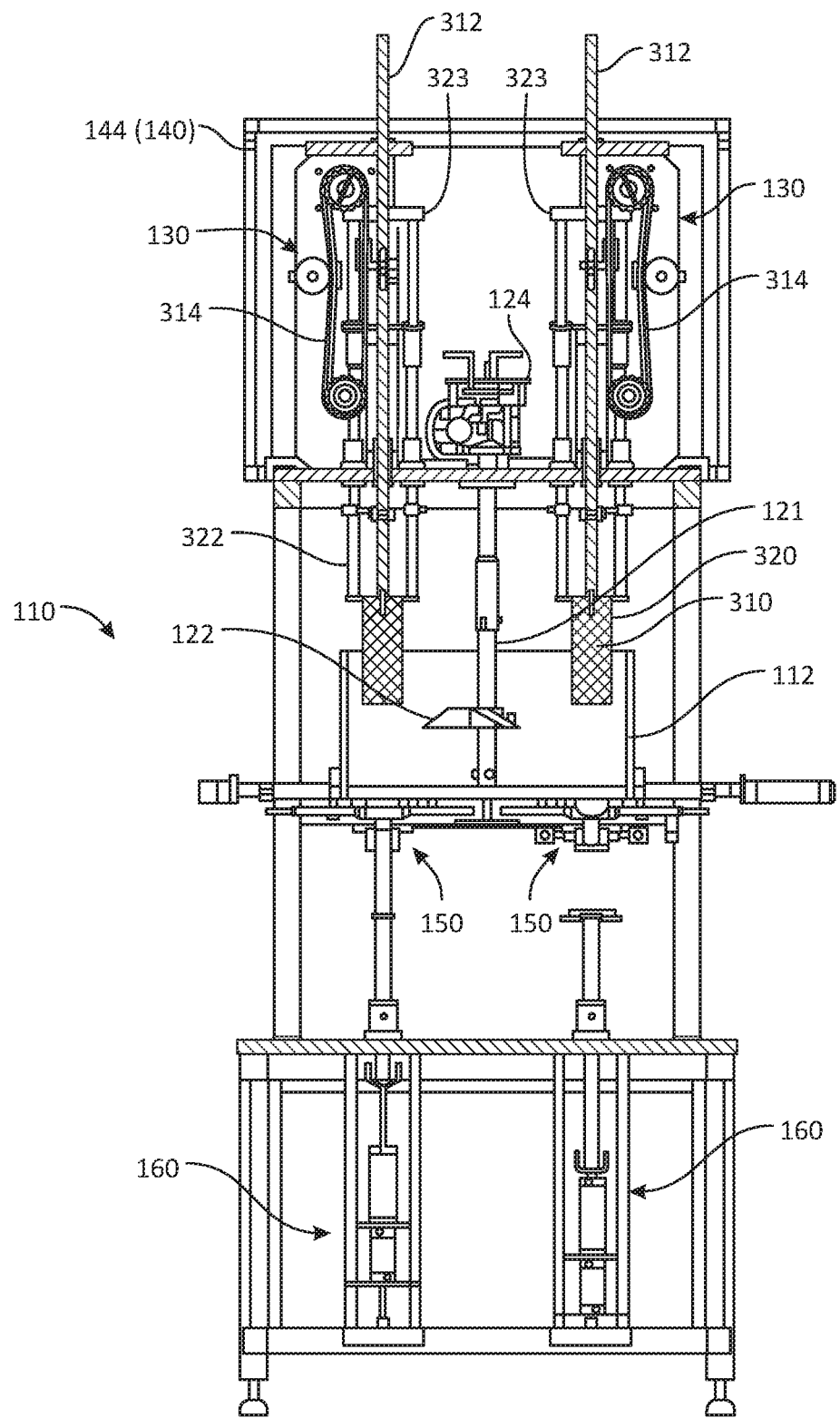
FIG. 7 is a diagram illustrating a front view of a filling device according to an embodiment of the present disclosure.
Figure 8:
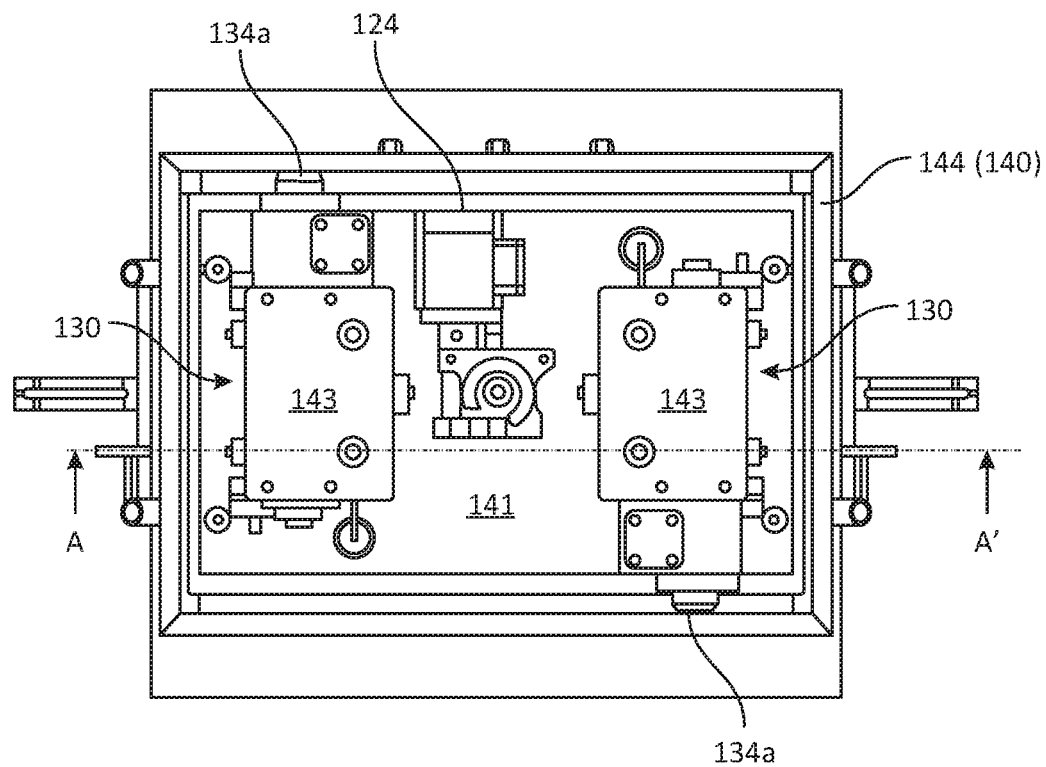
FIG. 8 is a diagram illustrating a top view of the filling device illustrated in FIG. 7.
Figure 9:
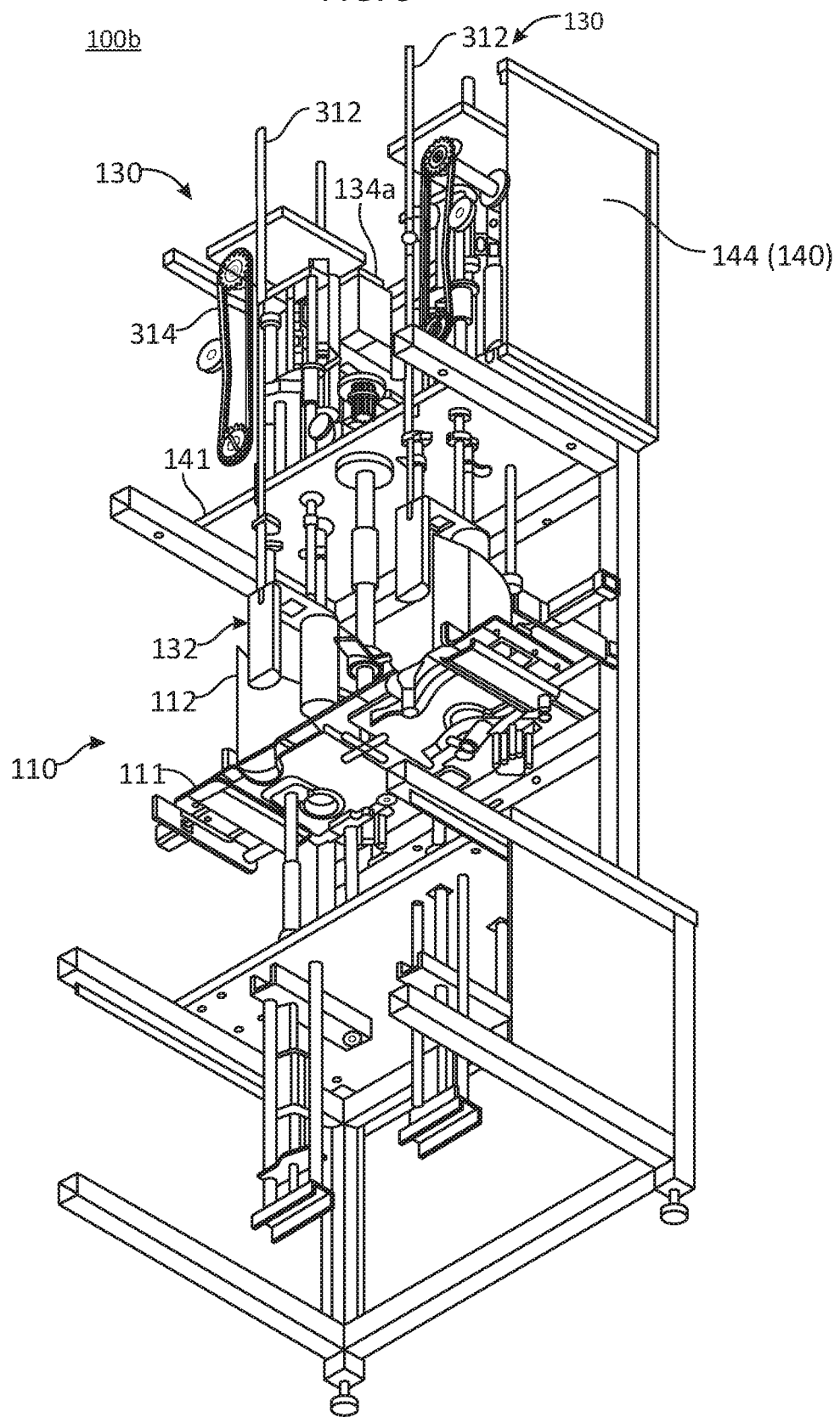
FIG. 9 is a diagram illustrating a sectional, perspective view of the filling device illustrated in FIG. 7, taken along sectional line A-A' of FIG. 8.

FIG. 7 is a diagram illustrating a front view of a filling device 100b according to an embodiment of the present disclosure. FIG. 8 is a diagram illustrating a top view of the filling device 100b illustrated in FIG. 7. FIG. 9 is a diagram illustrating a sectional, perspective view of the filling device 100b illustrated in FIG. 7, taken along sectional line A-A' of FIG. 8.

With reference to FIGS. 1-9, filling devices (e.g., the filling device 100, the filling device 100a, and the filling device 100b) according to embodiments of the present disclosure may include a vessel 110, a first actuator system 120, at least one second actuator system 130, a frame 140, and at least one valve 150.

The vessel 110 may be configured to hold a food product in an internal space of the vessel 110. For example, the vessel 110 may include a floor 111 and a wall 112 that surrounds at least a portion of the floor 111. As shown in FIGS. 1-7 and 9, the wall 112 has a circular shape such as to define, with the floor 111, the internal space of the vessel 110, but embodiments of the present disclosure are not limited thereto. According to embodiments, the food product may include both a solid and a liquid. For example, the food product may include a wet product, a dry product in a brine, and/or a liquid. For example, the food product may include pico de gallo, pasta, cooked beans, and/or cooked beans salad. However, the food product is not limited to the above-described food products, and the food product may include various different foods.

The floor 111 may include at least one through hole 114 that is configured to allow food product within the vessel 110 to exit the vessel 110 in a downward direction. According to embodiments, at least one packaging, provided below the vessel 110, may then receive the food product that has exited the vessel 110 via the at least one through hole 114. With reference to FIGS. 1-2, two through holes 114 are within the floor 111, but embodiments of the present disclosure are not limited thereto. For example, the number of the through holes 114 may be less than or more than two.

The first actuator system 120 may be configured to move the food product within the vessel 110, such that the food product is positioned within the vessel 110 to fill at least one packaging based on actuation of the at least one second actuator system 130. The at least one second actuator system 130 may be configured to cause the food product within the vessel 110 to exit the vessel 110 through the at least one through hole 114 and fill the at least one packaging. According to embodiments, the packaging may be any type of known packaging for holding food. For example, the packaging may be any type of container configured to hold a food product.

The first actuator system 120 may include a shaft 121, a scraper 122, and a first actuator 124. The shaft 121 may be rotatably mounted to the floor 111 and may extend upwards from the floor 111 to the first actuator 124. The scraper 122 may be mounted to the shaft 121 and may be configured to rotate with the shaft 116 around a vertical axis of the shaft 121. The scraper 122, by rotating, may be configured move the food product within the vessel 110 to be directly above the at least one through hole 114. With the food product in such a position, the at least one second actuator system 130 may then be actuated to cause the food product to exit the vessel 110 through the at least one through hole 114 and fill the at least one packaging. With reference to FIGS. 1-4 and 7, the scraper 122 may be a paddle scraper (i.e., includes a paddle shaped blade(s)), but embodiments of the present disclosure are not limited thereto. For example, the scraper 122 may also be or include any type of scraper, including a turbine scraper, an anchor scraper, a propeller scraper, a helical scraper, etc. The first actuator 124 may be configured to actuate (e.g., rotate) the shaft 116 and the scraper 122 by actuating the shaft 116. Thus, the food product within the vessel 110 may be moved. According to embodiments, the scraper 122 may extend from the shaft 116 in only a single radial direction of the shaft 116, which may better ensure that downward movement of the piston systems 132 at certain times does not interfere with rotation of the scraper 122.

Each second actuator system 130 may include at least one piston system 132 and at least one second actuator 134. The at least one second actuator 134 may be configured to actuate the at least one piston system 132. For example, the at least one second actuator 134 may be configured to actuate the at least one piston system 132 in the upward and/or downward direction. According to embodiments, a horizontal position of each piston system 132 may correspond to a horizontal position of a respective one of the at least one through hole 114, and each piston system 132, by being actuated by the at least one second actuator 134, may be configured to cause a certain volume of the food product to exit out of a respective one of the at least one through hole 114 and fill packaging.

According to embodiments, the first actuator 124 may be a same or different type of actuator from a type(s) of the at least one second actuator 134. According to embodiments, the first actuator 124 and/or the at least one second actuator 134 may be or include, for example, electrical, pneumatic, and/or hydraulic actuators, but embodiments of the present disclosure are not limited thereto. According to embodiments, the first actuator 124 and/or the at least one second actuator 134 may be configured as linear and/or rotary actuators, but embodiments of the present disclosure are not limited thereto.

As an example, the first actuator 124 may be or include a motor (e.g., a servo motor) that is configured to cause rotational motion of the shaft 121 and the scraper 122, and the at least one second actuator 134 may include at least one motor 134a and at least one pneumatic or hydraulic actuator 134b configured to cause linear (vertical) motion of components of the at least one piston system 132.

With reference to FIGS. 1-2, a single motor 134a may be configured to actuate components of two of the piston systems 132, and a single pneumatic or hydraulic actuator 134b may be configured to actuate the same and/or different components of the two of the piston systems 132. However, embodiments of the present disclosure are not limited thereto. For example, the single motor 134a may be configured to actuate components of only one piston system 132 or more than two piston systems 132. Also, the single pneumatic or hydraulic actuator 134b may be configured to actuate components of only one piston system 132 or more than two piston systems 132. According to embodiments, a plurality of motors 134a may be provided to actuate components of respective piston systems 132 or respective sets of the piston systems 132, and/or a plurality of the pneumatic or hydraulic actuator 134b may be provided to actuate components of respective piston systems 132 or respective sets of the piston systems 132. Example processes performed by the actuators will be described further below.

With reference to FIGS. 4-6, the filling device 100a may include a plurality (e.g., two) of the second actuator system 130. For example, each second actuator system 130 may include a motor 134a, a pneumatic or hydraulic actuator 134b, and two piston systems 132 that are actuated by the motor 134a and the pneumatic or hydraulic actuator 134b of the second actuator system 130. Thus, the filling device 100a may include, for example, two motors 134a, two pneumatic or hydraulic actuators 134b, and four piston systems 132. The floor 111 of the vessel 110 may include a plurality (e.g., four) of through holes 114 that respectively correspond to the plurality (e.g., four) of the piston systems 132.

Each piston system 132 of the second actuator system 130 may include a piston 310 and a cylinder 320 that are at least partially provided within the vessel 110. According to embodiments, the cylinder 320 may also be referred to as a sleeve.

The piston 310 may be within the cylinder 320 and may be configured to move in a vertical direction and, at least in some cases, in the vertical directions with respect to the cylinder 320. For example, the motor 134a of the second actuator system 130 may configured to move the piston 310 in the vertical directions. According to embodiments, each second actuator system 130 may include a single motor 134a that is configured to cause all pistons 310 of the second actuator system 130 to move in a same vertical direction at a same time. For example, each piston 310 of the second actuator system 130 may be attached to a respective connector 312 (e.g., a rod) that extends upwards from the piston 310, and a portion (e.g., an upper portion) of each connector 312 may be fixed to a respective drive belt 314 of the second actuator system 130 that is driven by the single motor 134a, thus causing the connectors 312 and the pistons 310 to simultaneously move in the vertical directions when the drive belts 314 are driven. According to embodiments, the single motor 134a may be configured to simultaneously drive to each of the drive belts 314 of the second actuator system 130 by rotating a shaft 116 connected to the motor 134a. According to embodiments, a plurality of the motor 134a (or another type of actuator(s)) may be provided in the second actuator system 130 to respectively drive, simultaneously or at separate times, a respective connector 312 and a respective piston 310 in a vertical direction.

The cylinders 320 may be configured to move in the vertical directions and, at least in some cases, in the vertical directions with respect to the piston 310 therein. For example, the pneumatic or hydraulic actuator 134b of the second actuator system 130 may configured to move at least one of the cylinders 320 of the second actuator system 130 in the vertical directions. According to embodiments, each second actuator system 130 may include a single pneumatic or hydraulic actuator 134b that is configured to cause all cylinders 320 of the second actuator system 130 to move in a same vertical direction at a same time. For example, each cylinder 320 of the second actuator system 130 may be attached to a same body 321 (e.g., a plate) that extends horizontally to each of the cylinders 320, and at least one portion of the body 321 may be attached to connectors 322 (e.g., rods) that extend upwards from the body 321. A portion (e.g., an upper portion) of each connector 322 of the second actuator system 130 may be fixed to a body 323 (e.g., a plate) that horizontally extends. The body 323 may be provided above the pneumatic or hydraulic actuator 134b and connected to an actuated body 134b1 (refer to FIG. 3) of the pneumatic or hydraulic actuator 134b. Thus, by actuating the actuated body 134b1 in a vertical direction, the pneumatic or hydraulic actuator 134b may cause the body 323 to move in the same vertical direction, thereby causing the body 321, the connectors 322, and the cylinders 320 of the second actuator system 130 to also move in the same vertical direction. According to embodiments, a plurality of the pneumatic or hydraulic actuator 134b (or another type of actuator(s)) may be provided in the second actuator system 130 to respectively drive, simultaneously or at separate times, a respective connector 322 and a respective cylinder 320 in a vertical direction.

The frame 140 may be above the vessel 110 and may include at least one body that is configured to have components of the first actuator system 120 and the at least one second actuator system 130 mounted thereon. According to embodiments, the frame 140 may include a first body 141 (e.g., a plate) that horizontally extends and on which the first actuator 124 is mounted. The frame 140 may also include second bodies 142 that are connected to the first body 141 and vertically extend upwards therefrom, and the frame 140 may further include at least one third body 143 (e.g., a plate) that connects a plurality (e.g., two) of the second bodies 142 together at top portions of the plurality of the second bodies 142. The second bodies 142 may be structure on which components of the at least one second actuator system 130 are mounted. For example, the motors 134a may be mounted on outer sides of the second bodies 142, and the drive belts 314 may be mounted on inner sides of the second bodies 142. The shaft 121, the connectors 312, and the connectors 322 may extend through and may be configured to move vertically with respect to the first body 141. The connectors 322 may also extend through and may also be configured to move vertically with respect to the at least one third body 143.

With reference to FIGS. 7-9, the frame 140 of the filling device 100b may further include at least one outer wall 144 that at least partially surrounds, in horizontal directions, the second actuator systems 130, the first body 141, the second bodies 142, and the at least one third body 143. While the at least one outer wall 144 is described with reference to the filling device 100b, various filling devices (e.g., the filling device 100 and/or the filling device 100a) of embodiments of the present disclosure may include the at least one outer wall 144.

With reference to FIGS. 7-9, the filling device 100b may further include at least one lift 160. Each lift 160 may be provided below vessel 110 and may be configured to actuate such as to move at least one packaging in the vertical directions. For example, each lift 160 may be configured to actuate the at least one packaging upwards (refer to the lift 160 on a left side of FIG. 7), towards a respective valve 150 to receive food product via the respective valve 150, and downwards (refer to the lift 160 on the right side of FIG. 7), away from the respective valve 150 after the at least one packaging receives the food product. While the at least one lift 160 is described with reference to the filling device 100b, various filling devices (e.g., the filling device 100 and/or the filling device 100a) of embodiments of the present disclosure may include the at least one lift 160.

According to embodiments of the present disclosure, filling devices (e.g., the filling device 100, the filling device 100a, and the filling device 100b) may further include the at least one valve 150 (refer to FIGS. 6-7). The at least one valve 150 may be configured to allow food product within the vessel 110 to be selectively supplied to the at least one packaging based on an open or closed state of valves of the at least one valve 150. According to embodiments, a total number of the valves may be equal to a total number of the through holes 114 within the floor 111 of the vessel 110, and each valve 150 may be communicatively connected to a respective through hole 114 at a bottom side of the floor 111.

Example embodiments of the valve 150 are described below with reference to FIGS. 10-13.

Figure 10:
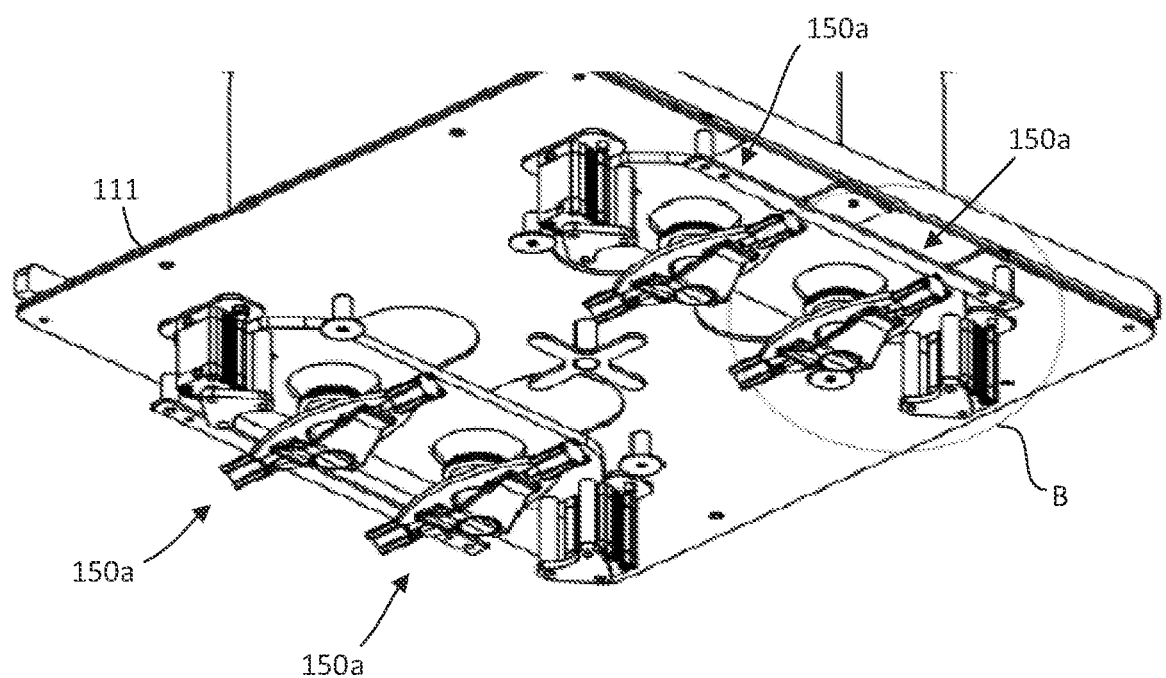
FIG. 10 is a diagram illustrating a perspective view of valves according to embodiments of the present disclosure.
Figure 11:
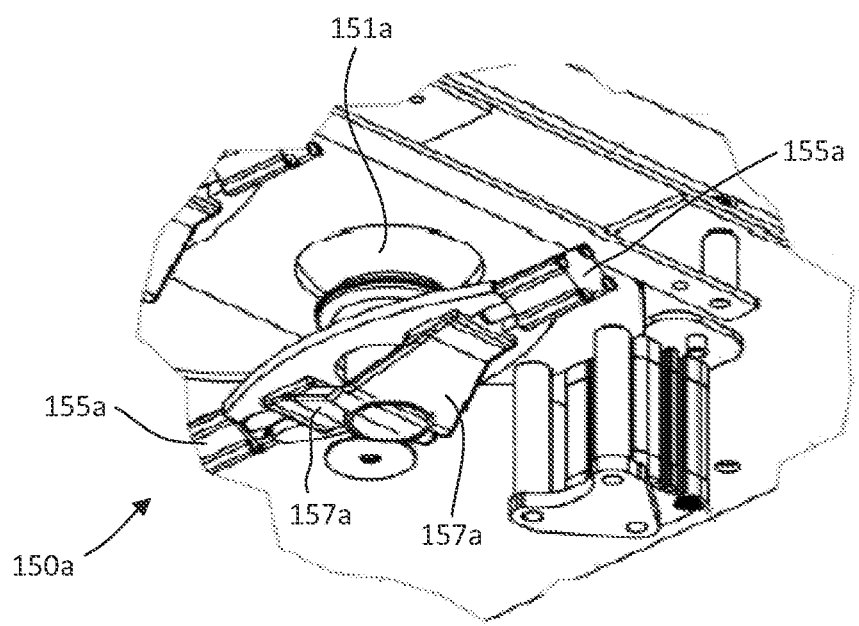
FIG. 11 is a diagram illustrating an enlarged view of an area B of FIG. 10.
Figure 12:
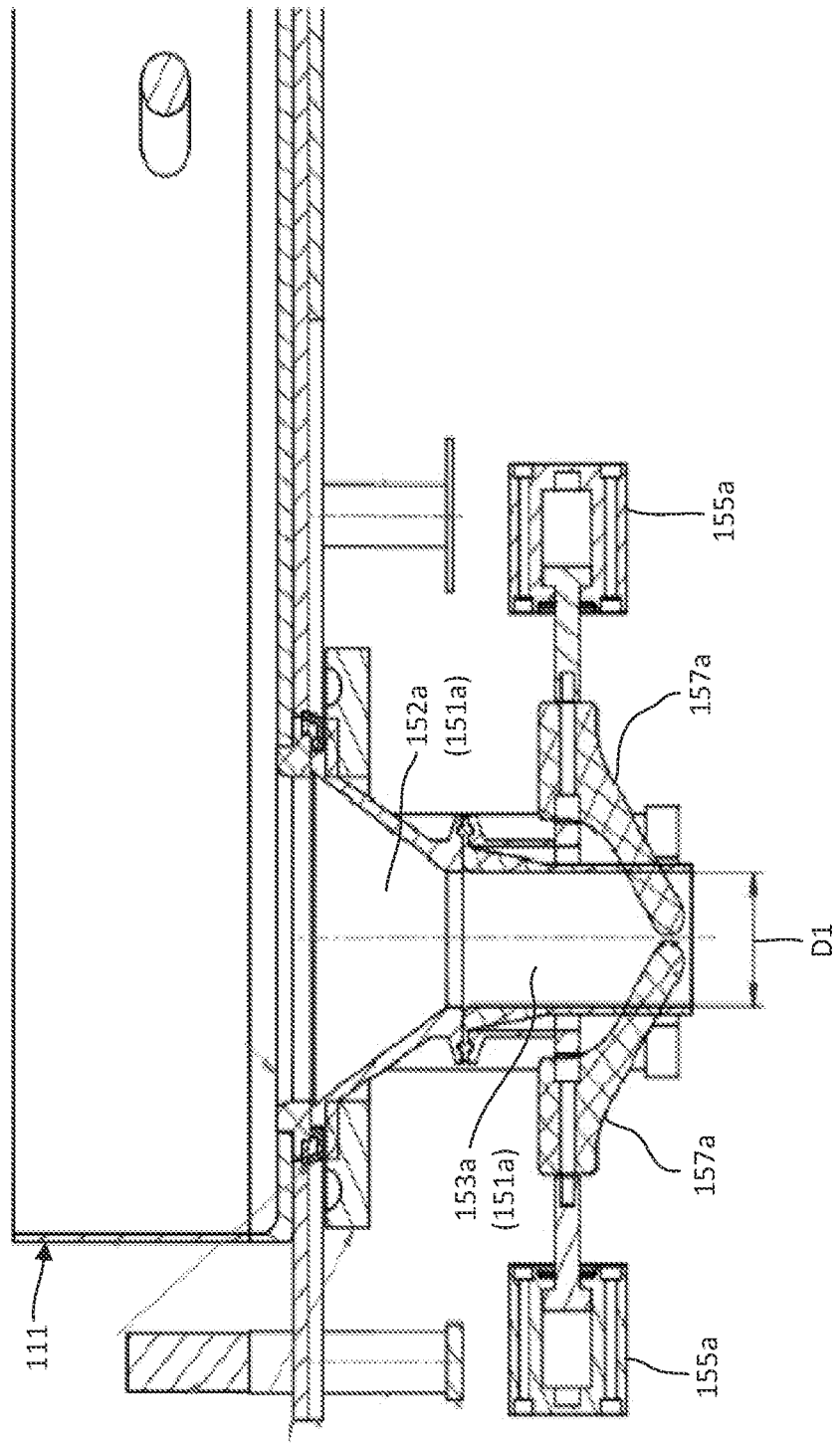
FIG. 12 is a diagram illustrating a cross-sectional view of the valve.
Figure 13:
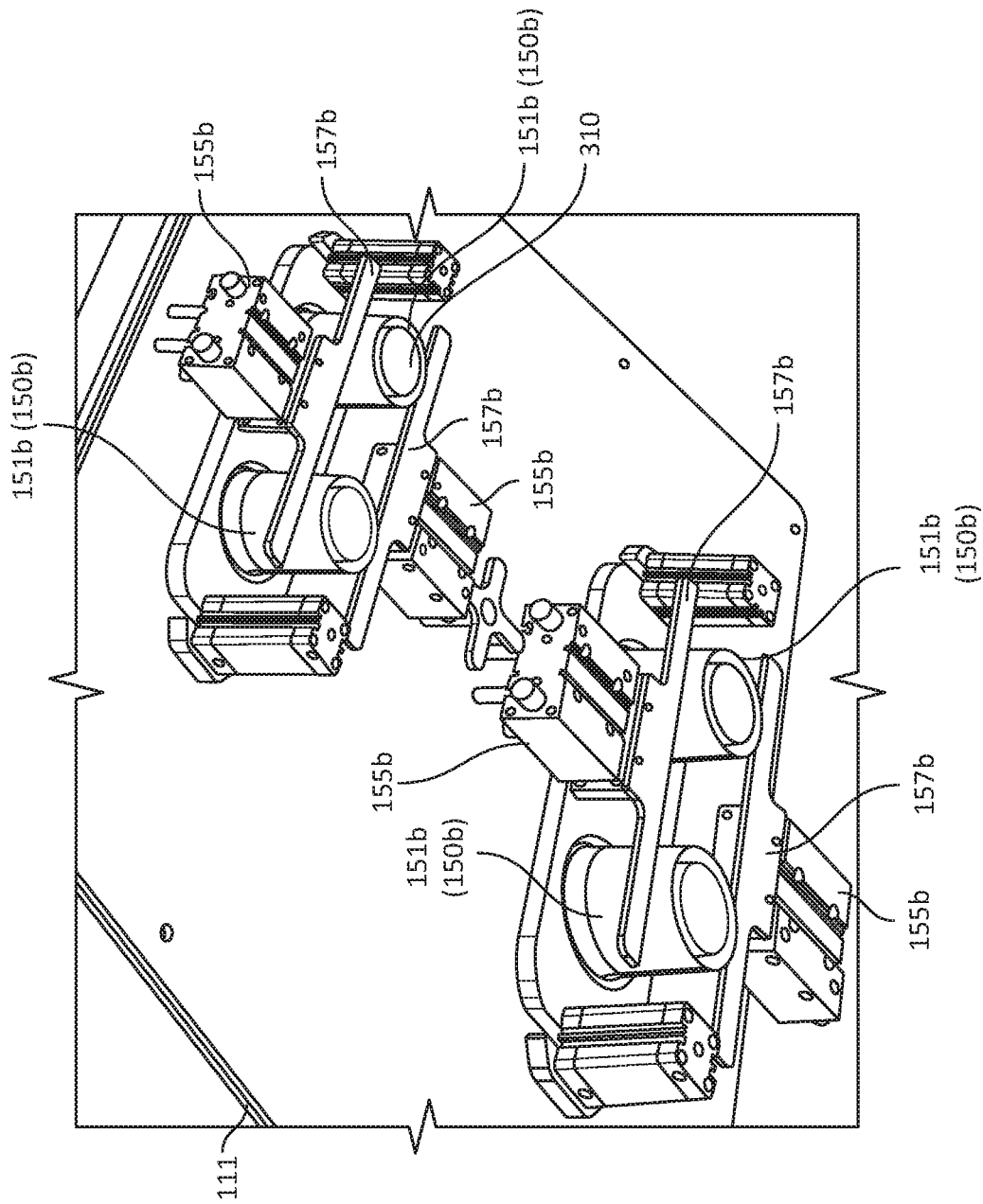
FIG. 13 is a diagram illustrating a perspective view of valves according to embodiments of the present disclosure.

FIG. 10 is a diagram illustrating a perspective view of valves 150a according to embodiments of the present disclosure. FIG. 11 is a diagram illustrating an enlarged view of an area B of FIG. 10. FIG. 12 is a diagram illustrating a cross-sectional view of the valve 150a. FIG. 13 is a diagram illustrating a perspective view of valves 150b according to embodiments of the present disclosure.

With reference to FIGS. 10-12, the valves 150a may include a filling nozzle 151a, at least one actuator 155a, and at least one opening/closing body 157a.

The filling nozzle 151a may be mounted to a bottom side of the floor 111 of the vessel 110, and may be communicatively connected to a respective through hole 114 within the floor 111 so as to be configured to receive food product within the vessel 110. The filling nozzle 151a may have a shape of a funnel and may include an input portion 152a and an output portion 153a. However, embodiments of the present disclosure are not limited thereto. According to embodiments, an inner diameter of the filling nozzle 151a may be the same or substantially the same as an outer diameter of the piston 310. For example, the inner diameter D1 of the output portion 153a of the filling nozzle 151a may be the same or substantially the same as an outer diameter of the piston 310.

The at least one actuator 155a may be provided at sides of the filling nozzle 151a, and may be configured to actuate towards and away from the filling nozzle 151a. For example, the at least one actuator 155a may be at least one linear actuator, but embodiments of the present disclosure are not limited thereto. Also, two or more of the actuators 155 may be a part of each valve 150a, but embodiments of the present disclosure are not limited thereto.

The at least one opening/closing body 157a of the valve 150a may be respectively connected to the at least one actuator 155a so as to be configured to be actuated by the at actuator 155a to open and close an internal space of the valve 150a to allow food product to exit and disallow food product from exiting the valve 150a via the output portion 153a. According to embodiments, a total number of the opening/closing bodies 157a of the valve 150a may correspond to a total number of the actuators 155a of the valve 150a, but embodiments of the present disclosure are not limited thereto. According to embodiments, the opening/closing bodies 157a may be at least partially within the output portion 153a and distal ends of the opening/closing bodies 157a may be configured to move towards each other, based on the actuators 155a actuating towards the filling nozzle 151a, such as to prevent food product from exiting the filling nozzle 151a via the output portion 153a. Also, the distal ends of the opening/closing bodies 157a may be configured to move away from each other, based on the actuators 155a actuating away from the filling nozzle 151a, such as to allow food product to exit the filling nozzle 151a via the output portion 153a.

According to embodiments, the combination of the opening/closing bodies 157a and the actuators 115a may be configured as a clamp.

With reference FIG. 13, the valves 150b may include a filling nozzle 151b. At least two of the valves 150b may share at least one actuator 155b and at least one opening/closing body 157b. As shown in FIG. 13, pairs of the valves 150b may share two actuators 155b and two opening/closing bodies 157b.

The filling nozzles 151b may be mounted to a bottom side of the floor 111 of the vessel 110, and may be communicatively connected to a respective through hole 114 within the floor 111 so as to be configured to receive food product within the vessel 110. The filling nozzle 151a may have a shape of a funnel and may include an input portion and an output portion. However, embodiments of the present disclosure are not limited thereto. According to embodiments, the filling nozzles 151b may formed of an elastically deformable membrane. However, embodiments of the present disclosure are not limited thereto. According to embodiments, an inner diameter of the filling nozzle 151b may be the same or substantially the same as an outer diameter of the piston 310. For example, the inner diameter of an output portion of the filling nozzle 151b may be the same or substantially the same as an outer diameter of the piston 310.

The at least one actuator 155b may be provided at sides of at least two (e.g. a pair) of the filling nozzles 151b, and may be configured to actuate towards and away from the pair of filling nozzles 151b. For example, the at least one actuator 155b may be at least one linear actuators, but embodiments of the present disclosure are not limited thereto. Also, two or more of the actuators 155b may be shared by the at least of the valves 150b, but embodiments of the present disclosure are not limited thereto.

The at least one opening/closing body 157b may be respectively connected to the at least one actuator 155b so as to be configured to be actuated by the at least one actuator 155b to open and close an internal space of the at least two valves 150b to allow food product to exit and disallow food product from exiting the at least two valves 150b via the output portions thereof. According to embodiments, a total number of the opening/closing bodies 157b may correspond to a total number of the actuators 155b, but embodiments of the present disclosure are not limited thereto. According to embodiments, the opening/closing bodies 157b may be completely outside the filling nozzles 151b. Based on the actuators 155b actuating towards the at least two filling nozzles 151b, distal ends of the opening/closing bodies 157b may move towards the at least two filling nozzles 151b, contact the at least two filling nozzles 151b, and apply an inward force to the at least two filling nozzles 151b such that the at least two filling nozzles 151b elastically deform to close an inner space thereof, thereby preventing food product from exiting the at least two filling nozzles 151b. Also, based on the actuators 155b actuating away from the at least two filling nozzles 151b, the distal ends of the opening/closing bodies 157b may be caused to move away from the at least two filling nozzles 151b such that the at least two filling nozzles 151b return to their initial shapes in which internal spaces thereof are open, thereby allowing food product to exit the at least two filling nozzles 151b.

According to embodiments, the combination of the opening/closing bodies 157b and the actuators 115b may be configured as a clamp.

An example process performed by filling devices (e.g., the filling device 100, the filling device 100a, and the filling device 100b) according to embodiments of the present disclosure is described below with reference to FIGS. 14A-F and FIGS. 15A-D.

FIGS. 14A-F are diagrams illustrating steps of a filling process according to embodiments of the present disclosure. FIGS. 15A-D are diagrams illustrating steps of the filling process and levels of food product according to embodiments of the present disclosure.

In FIGS. 14A-C and FIGS. 14E-F, the cylinder 320 is partially sectioned to illustrate a position of the piston 310 with respect to the cylinder 320.

In FIGS. 14A-F, only a single piston system 132 of a second actuator system 130 and a corresponding, single valve is shown, and the process is described below with respect to the single piston system 132 and the corresponding, single valve (e.g., a valve 150a or a valve 150b). However, it is to be understood that the process described below may be performed simultaneously and/or alternatively, for each piston system 132 of the filling device and each corresponding valve. For example, in a case where the second actuator system 130 includes a plurality of the piston systems 132, the filling device may simultaneously perform the process for the plurality of the piston systems 132 of the same second actuator system 130 and for the corresponding valves. Alternatively or additionally, in a case where a plurality of the second actuator systems 130 are provided, the filling device may perform the process for each second actuator system 130 (and corresponding valve(s)) at a respective, different time. According to embodiments, the filling process described below with reference to FIGS. 14A-F and FIGS. 15A-D may be repeated any number of times. According to embodiments, any number of the steps of the filling process may be performed while the scraper 122 (refer to, for example, FIG. 1) performs a food product moving process (e.g., rotates to move the food product to the areas in which the filling process is performed). For example, the step illustrated in FIG. 14B may start to be performed for a second actuator system 130 immediately after the scraper 122 rotates past a horizontal position of the second actuator system 130.

Figure 14C:
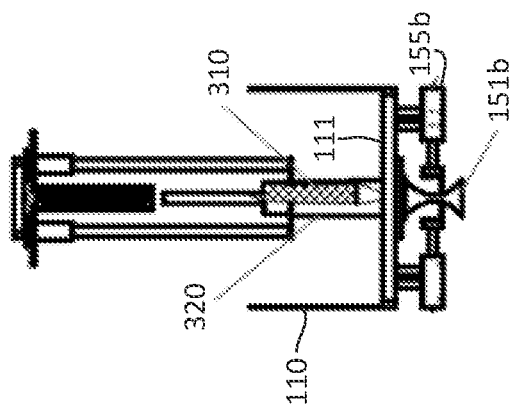
FIGS. 14A-F are diagrams illustrating steps of a filling process according to embodiments of the present disclosure.
Figure 14B:
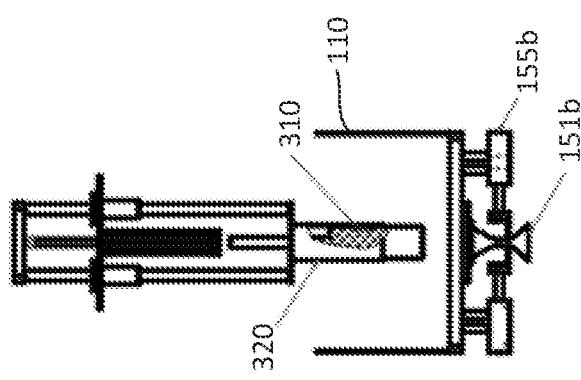
Figure 14A:
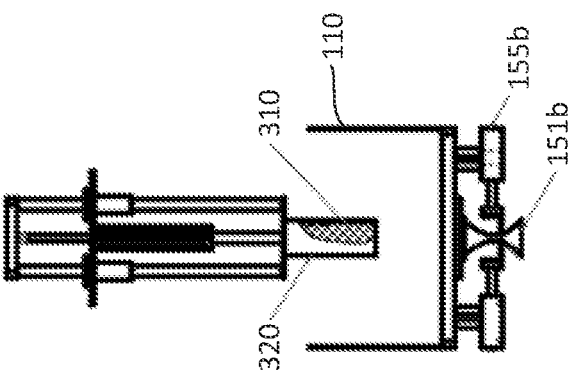

With reference to FIG. 14A, a valve (e.g., the valve 150a or the valve 150b) may be closed. For example, the at least one actuator (e.g., the at least one actuator 155a or the at least one actuator 155b) may be actuated to cause at least one opening/closing body (e.g., the at least one opening/closing body 157a or the at least one opening/closing body 157b) to close the valve. As shown in FIG. 14A, the actuators 155b are actuated to cause opening/closing bodies 157b (refer to FIG. 13) to move inwards such as to contact the filling nozzle 151b, and to apply an inward force to the filling nozzle 151b such that the filling nozzle 151b elastically deforms to close an inner space thereof, thereby preventing food product from exiting the filling nozzle 151b. In such case, the filling nozzle 151b may be or include an elastically deformable membrane such as to be configured to elastically deform. During the step illustrated in FIG. 14A, the piston 310 and the cylinder 320 may be in a raised position. For example, the piston 310 and the cylinder 320 may be controlled (e.g., actuated) such that bottom ends thereof are above the scraper 122 (refer to, for example, FIG. 1) so as to avoid interfering with a food product moving process performed by the scraper 122. Alternatively or additionally, the food product moving process may not be performed (e.g., the scraper 122 is not rotated) while such step(s) are performed.

Figure 15A:
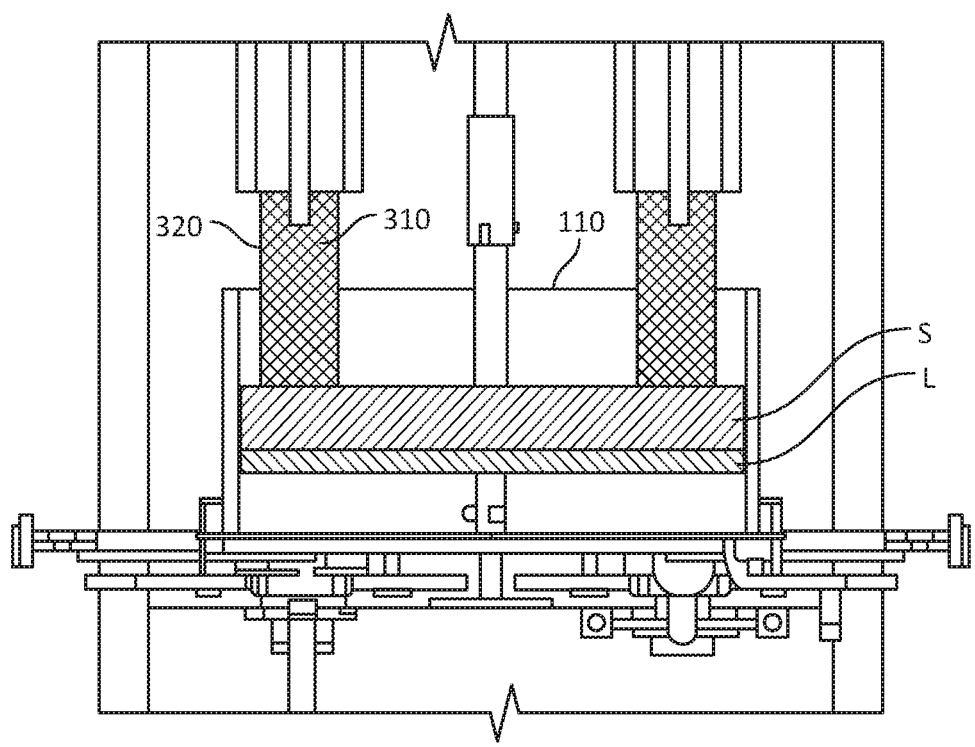
FIGS. 15A-D are diagrams illustrating steps of the filling process and levels of food product according to embodiments of the present disclosure.

With reference to FIG. 15A, while the step illustrated in FIG. 14A is performed, food product including a mix of solid S (e.g., dry product) and liquid L may be within the vessel 110, and moved within the vessel 110 by the scraper 122 (refer to, for example, FIG. 1). For example, the food product may be inserted into the vessel 110 by a manual operation or by an automatic operation by a conveying device of the filling device that conveys the food product into the vessel 110. The conveying device may include, for example, an outlet through which the food product is output to the vessel 110. According to embodiments, the conveying device may be controlled to convey the food product into the vessel 110 while one or more (e.g., some or all) of the steps of the filling process are performed.

Figure 15B:
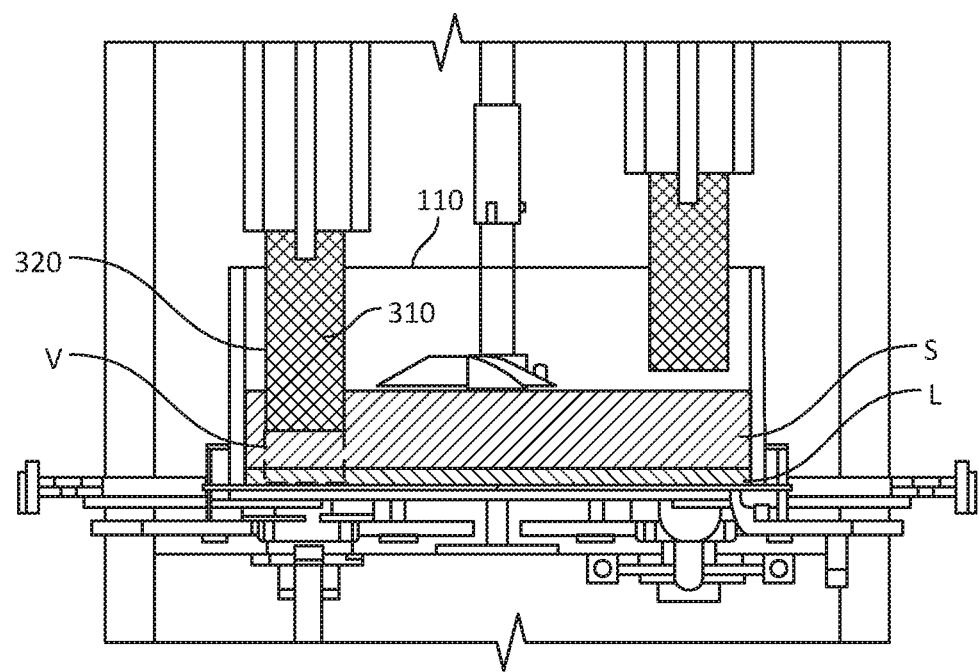

With reference to FIGS. 14B and 15B, the piston 310 may be controlled (e.g., actuated) to move downwards to a first lowered position corresponding to a predetermined (e.g., requested) filling volume V of food product. In such case, the cylinder 320 may be maintained in the raised position while the piston 310 moves downwards with respect the cylinder 320 such that, for example, a bottom end of the piston 310 is below a bottom end of the cylinder 320. Alternatively, the cylinder 320 may be controlled to move downward at a same time as the piston 310. According to embodiments, depending on the predetermined filling volume V, the bottom end of the piston 310 may be controlled to be at a height equal to or below a height of the scraper 122. According to embodiments, the step(s) described with reference to FIGS. 14B and 15B may be performed at a particular timing to avoid interfering with the food product moving process performed by the scraper 122. Alternatively or additionally, the food product moving process may not be performed (e.g., the scraper 122 is not rotated) while such step(s) are performed.

Figure 15C:
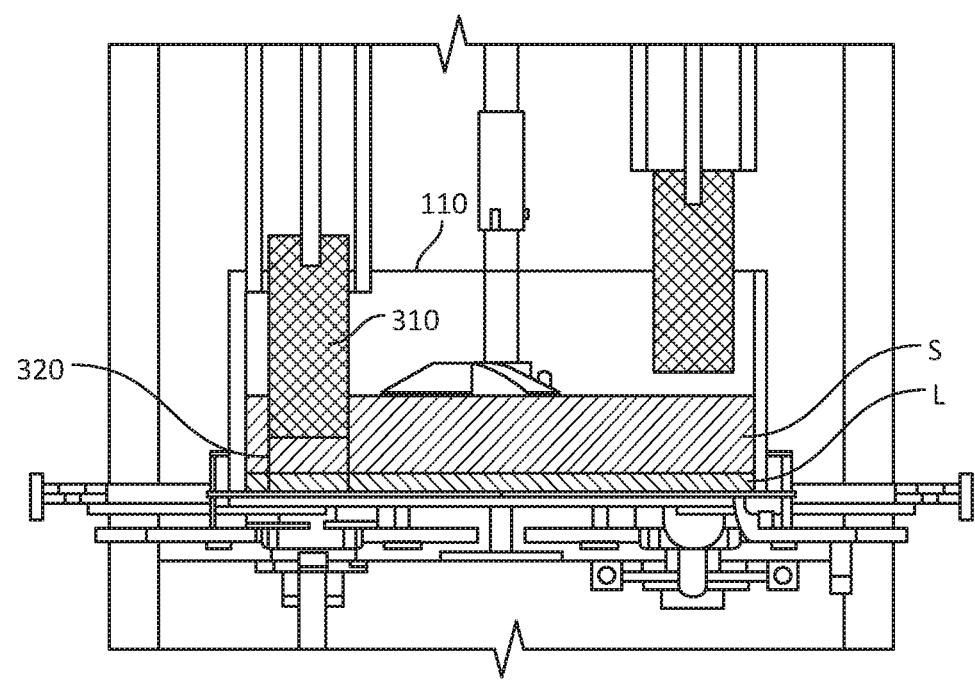

With reference to FIGS. 14C and 15C, the cylinder 320 may be controlled (e.g., actuated) to move downwards to a second lowered position, lower than the first lowered position of the piston 310, such as to isolate a portion of the solid S and liquid L of the food product within the cylinder 320. For example, the cylinder 310 and a bottom surface of the piston 310 may define an upside-down cup shape that contains the portion of the food product. According to embodiments, the piston 310 may be maintained in the first lowered position while the cylinder 320 moves downwards with respect to piston 310 such that, for example, the bottom end of the cylinder 320 is below the bottom end of the piston 310. Alternatively or additionally, the piston 310 may be lowered to the first lowered position while the cylinder 320 moves downwards towards the second lowered position. According to embodiments, the second lowered position may be a position in which the bottom end of the cylinder 320 is adjacent to a top surface of the floor 111 of the vessel 110. For example, the bottom end of the cylinder 320 may contact or nearly contact the top surface of the floor 111 of the vessel 110. According to embodiments, the portion of the solid S and liquid L of the food product isolated by the cylinder 320 may have the predetermined filling volume V. According to embodiments, the step(s) described with reference to FIGS. 14C and 15C may be performed at a particular timing to avoid interfering with the food product moving process performed by the scraper 122. Alternatively or additionally, the food product moving process may not be performed (e.g., the scraper 122 is not rotated) while such step(s) are performed.

Figure 14F:
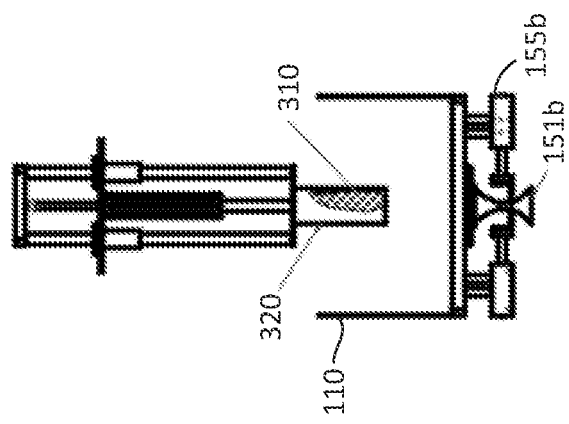
Figure 14E:
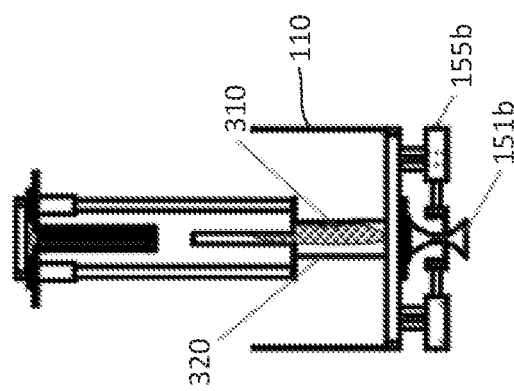
Figure 14D:
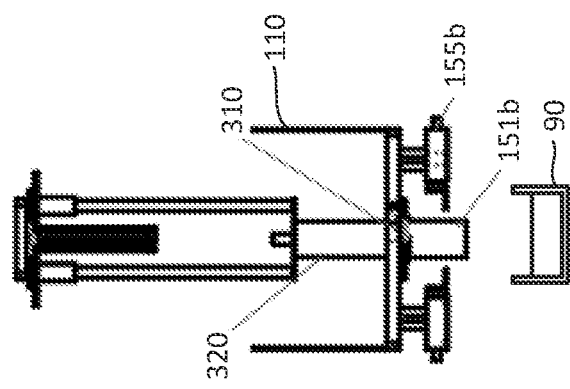

With reference to FIG. 14D, the valve (e.g., the valve 150a or the valve 150b) may be controlled to be opened. For example, the at least one actuator (e.g., the at least one actuator 155a or the at least one actuator 155b) may be actuated to cause the at least one opening/closing body (e.g., the at least one opening/closing body 157a or the at least one opening/closing body 157b) to open the valve. As shown in FIG. 14D, the actuators 155b are actuated to cause the opening/closing bodies 157b (refer to FIG. 13) to move outwards such as to move away from the filling nozzle 151b, such that the filling nozzle 151b returns (or is allowed to return) to its initial shape in which an internal space thereof is open, thereby allowing the food product to exit the filling nozzle 151b. In such case, the filling nozzle 151b may include the elastically deformable membrane such as to be configured to elastically deform. According to embodiments, the step(s) described with reference to FIG. 14D may be performed at a particular timing to avoid interfering with the food product moving process performed by the scraper 122. Alternatively or additionally, the food product moving process may not be performed (e.g., the scraper 122 is not rotated) while such step(s) are performed.

Figure 15D:
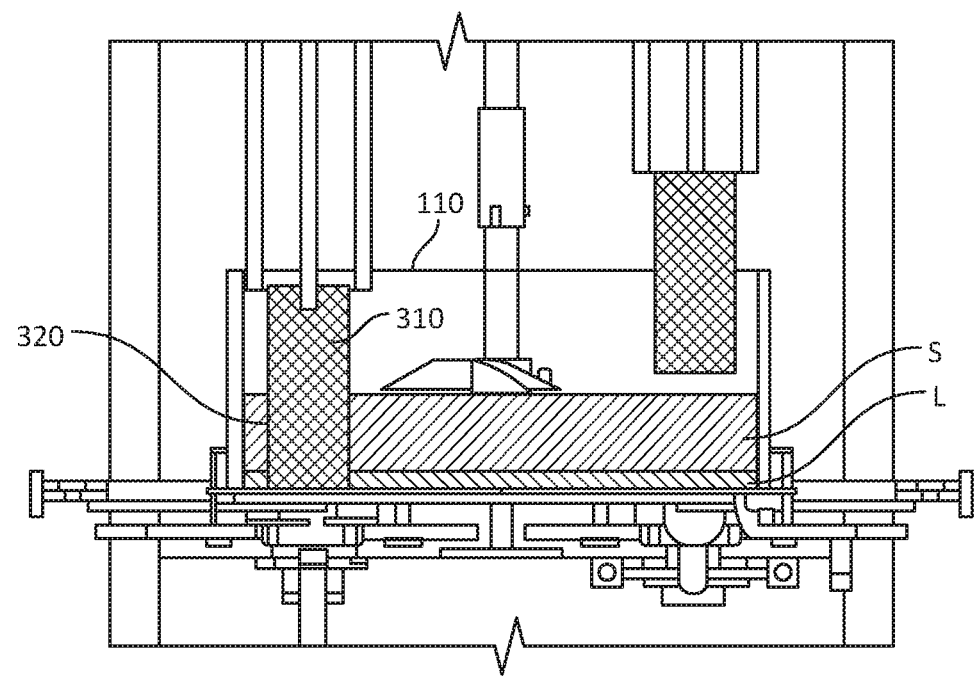

With reference to FIGS. 14D and 15D, the piston 310 may be controlled (e.g., actuated) to move downwards to a third lowered position, equal to or lower to the second lowered position, such as to push the portion of the solid S and liquid L of the food product, that is isolated by the cylinder 320, through the valve (e.g., the valve 150a or the valve 150b) and into at least one packaging (e.g., packaging 90) that is below the vessel 110. Thus, the at least one packaging may include the predetermined filling volume V of the food product. According to embodiments, the third lowered position may be a position in which at least a portion (e.g., the bottom end) of the piston 310 is within the filling nozzle (e.g., the filling nozzle 151a or the filling nozzle 151b). For example, the third lowered position may be a position at which the bottom end of the piston is adjacent to (e.g., at a same level of) a bottom end of the filing nozzle. An example of such positioning is shown in FIG. 13. Alternatively, the third lowered position may be a position at which the bottom end of the piston 310 is below a bottom end of the filing nozzle, such that the piston 310 protrudes downwards from the filling nozzle. According to embodiments, the step(s) described with reference to FIGS. 14D and 15D may be performed at a particular timing to avoid interfering with the food product moving process performed by the scraper 122. Alternatively or additionally, the food product moving process may not be performed (e.g., the scraper 122 is not rotated) while such step(s) are performed.

According to embodiments, the at least one actuator (e.g., the at least one actuator 155a or the at least one actuator 155b) may be actuated to cause the at least one opening/closing body (e.g., the at least one opening/closing body 157a or the at least one opening/closing body 157b) to open the valve before or while the piston 310 is controlled (e.g., actuated) to move downwards to the third lowered position, thus enabling the piston 310 to move to the third lowered position with substantially no resistance According to embodiments, instead of or in addition to the at least one actuator (e.g., the at least one actuator 155a or the at least one actuator 155b) being actuated to cause the at least one opening/closing body (e.g., the at least one opening/closing body 157a or the at least one opening/closing body 157b) to open the valve (e.g., the valve 150a or the valve 150b), the piston 310 entering the filling nozzle may cause the filling nozzle (e.g., the filling nozzle 151a or the filling nozzle 151b) to open. For example, with reference to FIGS. 10-12, in a case where the valve 150a is provided, the piston 310 moving downwards to the third lowered position may cause the opening/closing bodies 157a to move outwards to allow the food product to exit the filling nozzle 151a. With reference to FIG. 13, in a case where the valve 150b is provided, the piston 310 moving downwards to the third lowered position may cause the filling nozzle 151b to return to its initial shape in which an internal space thereof is open, thereby allowing the food product to exit the filling nozzle 151b.

With reference to FIG. 14E, after filling the packaging(s) with the food product, the piston 310 may be controlled (e.g., actuated) to move upwards to at least the second lowered position at which the cylinder 320 is provided, such that the piston 310 exits the filling nozzle (e.g., the filling nozzle 151a or the filling nozzle 151b), thus allowing the valve (e.g., the valve 150a or the valve 150b) to close. For example, the at least one actuator (e.g., the at least one actuator 155a or the at least one actuator 155b) may be actuated to cause the at least one opening/closing body (e.g., the at least one opening/closing body 157a or the at least one opening/closing body 157b) to close the valve (e.g., the valve 150a or the valve 150b). According to embodiments, the step(s) described with reference to FIG. 14E may be performed at a particular timing to avoid interfering with the food product moving process performed by the scraper 122. Alternatively or additionally, the food product moving process may not be performed (e.g., the scraper 122 is not rotated) while such step(s) are performed.

With reference to FIG. 14F, the piston 310 and the cylinder 320 may be controlled (e.g., actuated) to move upwards to the raised position, thereby completing the filling process, which may then be repeated any number of times.

According to embodiments, with reference to FIGS. 16-19. a filling system 1 according to embodiments of the present disclosure is described below.

Figure 16:
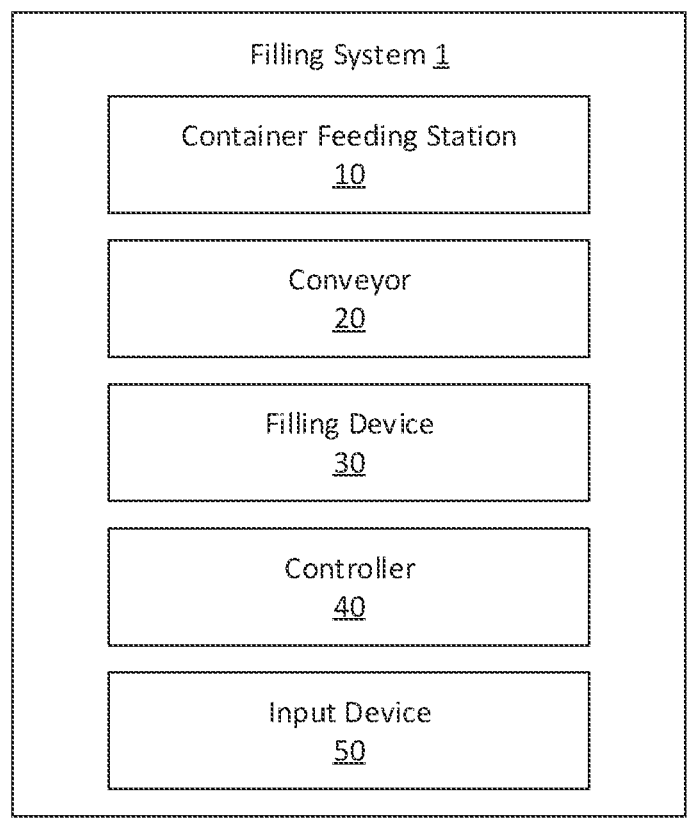
FIG. 16 is a block diagram of a filling system according to an embodiment of the present disclosure.
Figure 17:
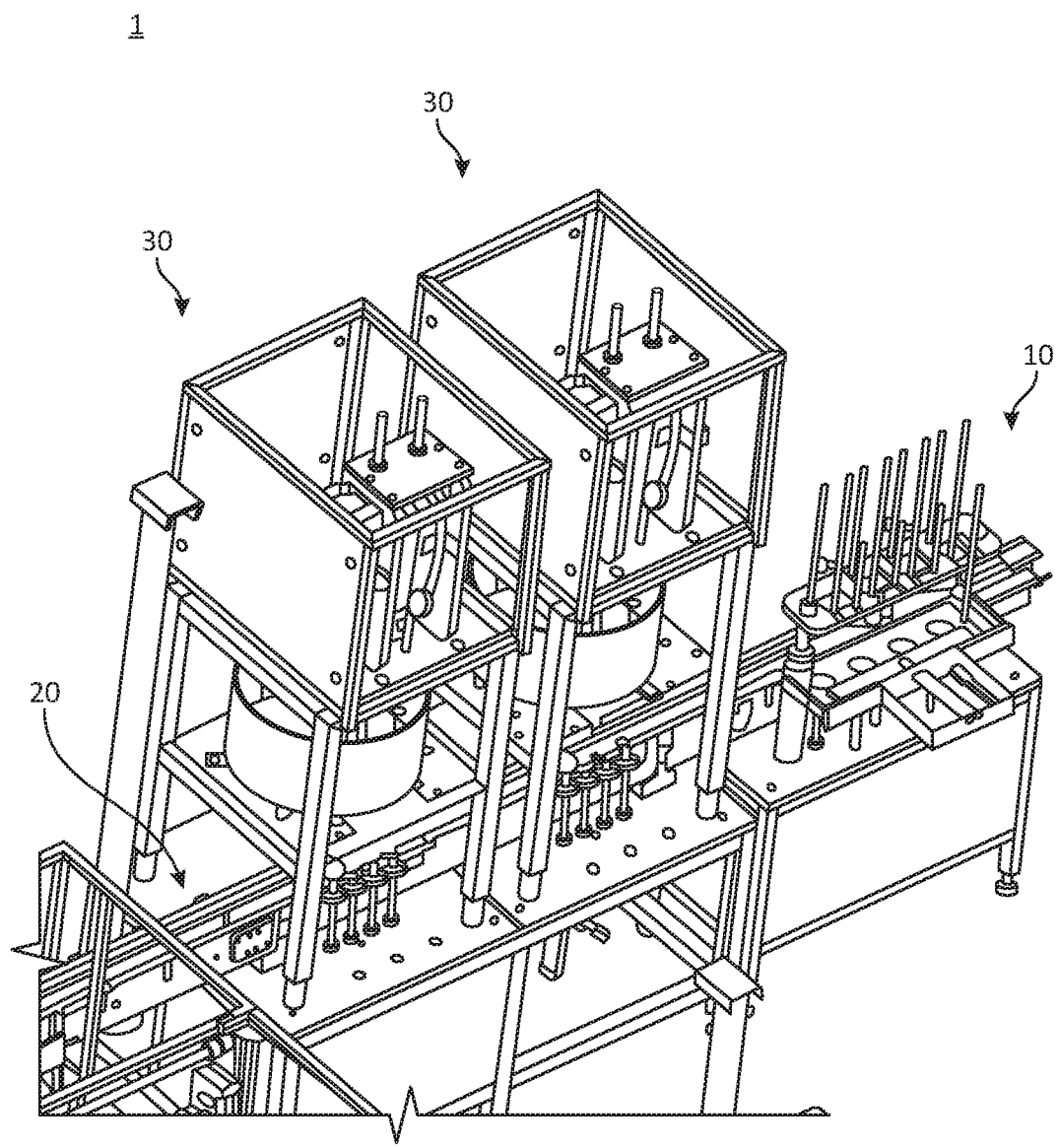
FIG. 17 is a diagram illustrating a first perspective view of portions of the filling system according to an embodiment of the present disclosure.
Figure 18:
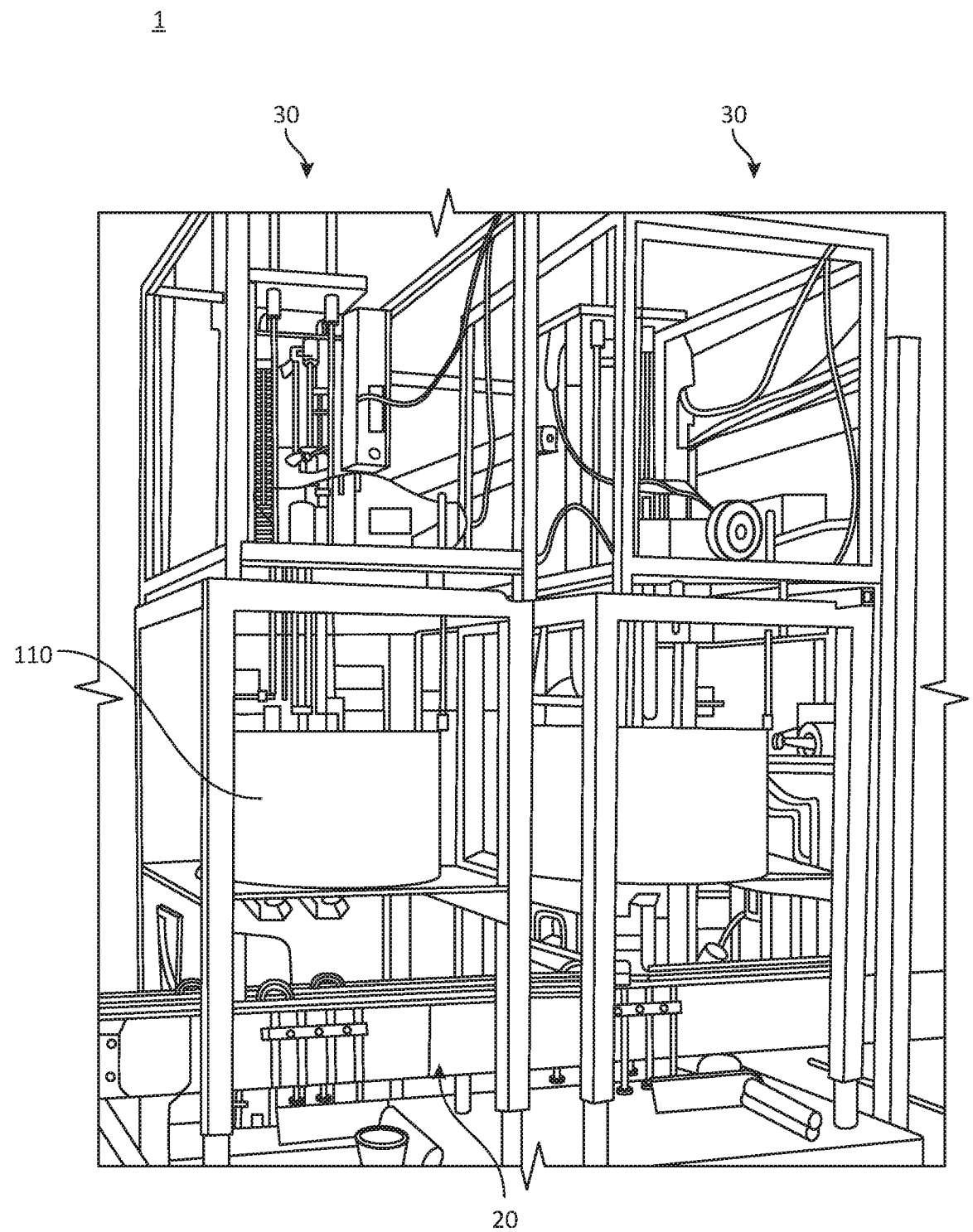
FIG. 18 is a diagram illustrating a second perspective view of portions of the filling system according to an embodiment of the present disclosure.
Figure 19:
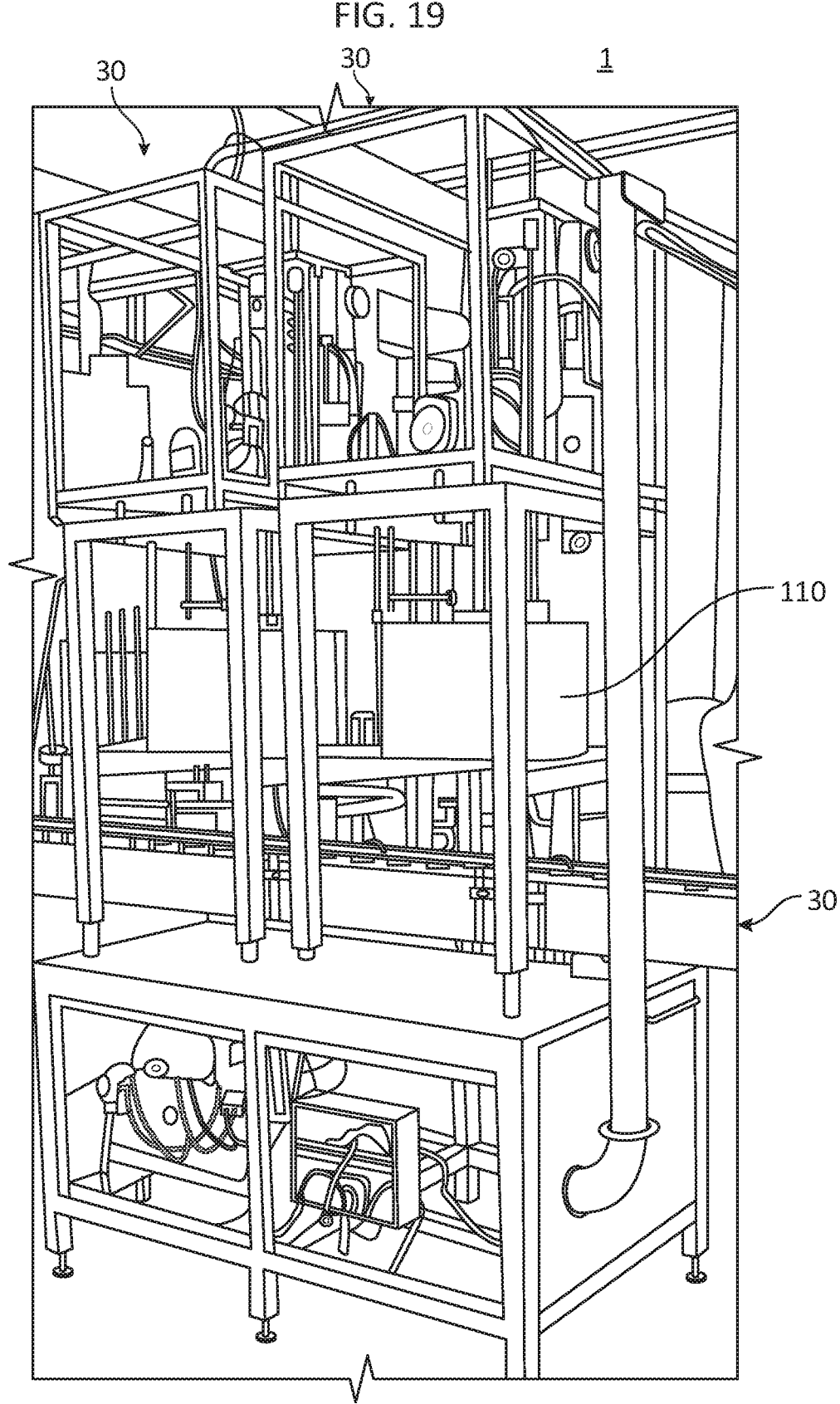
FIG. 19 is a diagram illustrating a third perspective view of portions of the filling system according to an embodiment of the present disclosure.

FIG. 16 is a block diagram of the filling system 1 according to an embodiment of the present disclosure. FIG. 17 is a diagram illustrating a first perspective view of portions of the filling system 1 according to an embodiment of the present disclosure. FIG. 18 is a diagram illustrating a second perspective view of portions of the filling system 1 according to an embodiment of the present disclosure. FIG. 19 is a diagram illustrating a third perspective view of portions of the filling system 1 according to an embodiment of the present disclosure.

The filling system 1 may include packaging feeding station 10, a conveyor 20 (e.g., a conveyor belt), at least one filling device 30 (e.g., the filling device 100, the filling device 100a, and the filling device 100b), a controller 40, and an input device 50.

The packaging feeding station 10 may be configured to feed packaging (e.g., cups) onto the conveyor 20. The conveyor 20 may be configured to move the packaging thereon to the at least one filling device 30 (e.g., the filling device 100, the filling device 100a, and the filling device 100b) to receive food product, and from the filling device 30 after receiving the food product. The conveyor 20 may extend within the at least one filling device 30, below the vessel 110 of the at least one filling device 30. The at least one filling device 30 may be configured to move and feed the food product to the packaging as, for example, described above with reference the filling device 100, the filling device 100a, and the filling device 100b.

The controller 40 may comprise at least one processor and memory storing computer instructions. The computer instructions, when executed by the at least one processor, may be configured to cause the components (e.g., the packaging feeding station 10, the conveyor 20, the at least one filling device 30) to perform their respective functions. For example, the computer instructions may cause the at least one processor of the controller 40 to control the at least one filling device 30 to perform the food product moving, packaging raising, and filling processes (including the food product moving and filling processes described above with reference to FIGS. 14A-F and 15A-D) of the present disclosure by controlling, for example, the first actuator(s) 124, the second actuator(s) 134, actuators (e.g., actuators 155a or actuators 155b) of a valve(s) (e.g., valves 150a or valves 150b), and/or the lift 160 to perform their respective functions.

The input device 50 (e.g., an inputter) may include any device capable of receiving an input from a user. For example, the input device 50 may include at least one button, switch, touchscreen, etc. According to embodiments, the input device 50 may be connected to the controller 40, and the controller 40 may obtain user inputs inputted via the input device 50, and control the components of the filling system 1 to perform their respective functions based on the user inputs. For example, the user inputs may indicate a start function, a stop function, and criteria for performing food product moving and filling processes. For example, the indicated criteria may include the predetermined filling volume V (refer to FIGS. 14B and 15B), and the controller 40 may determine the first lowered position based on the predetermined filling volume V.

Figure 20:
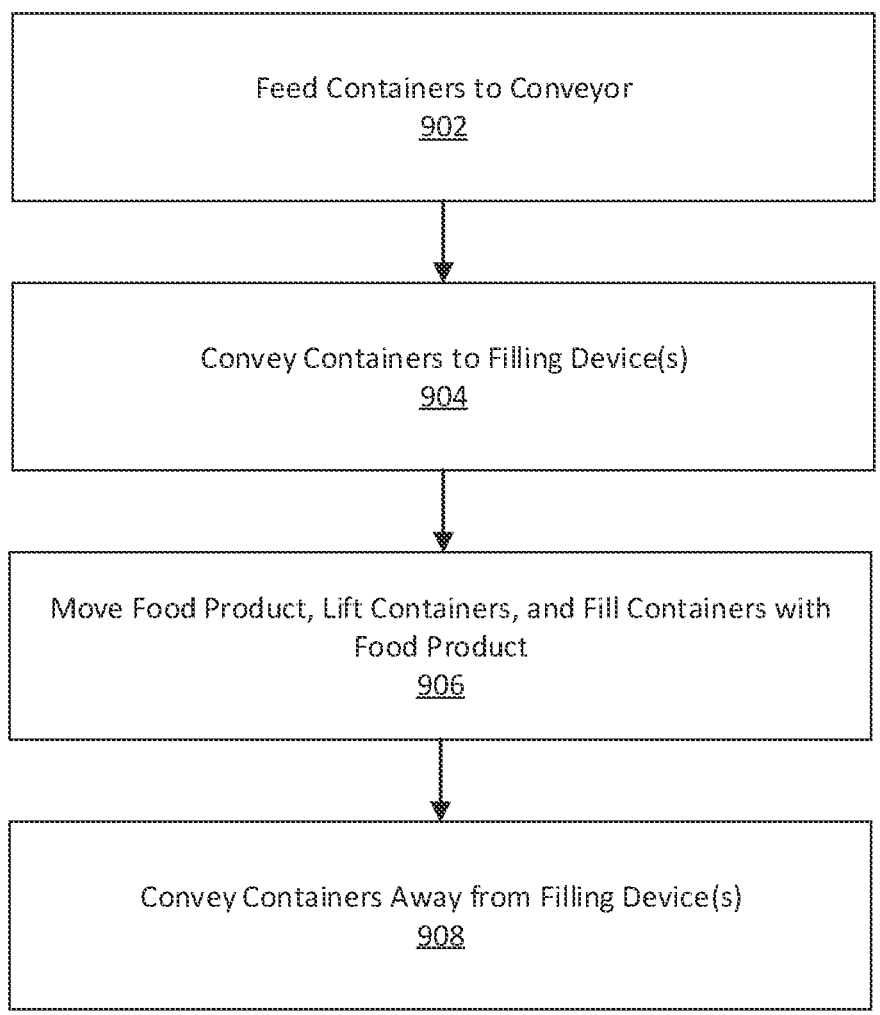
FIG. 20 is a block diagram of example processes performed by a filling system according to an embodiment of the present disclosure.

With reference to FIG. 20, examples processes performed by the filling system 1 based on control by the controller 40 are described below. FIG. 20 is a block diagram of the example processes.

According to embodiments, the controller 40 may control the packaging feeding station 10 to feed packaging to the conveyor 20 (process 902), in accordance with embodiments of the present disclosure. The controller 40 may control the conveyor 20 to convey the packaging to the at least one filling device 30 (process 904), in accordance with embodiments of the present disclosure. The controller 40 may control, at predetermined timings, the at least one filling device 30 to move the food product within at least one vessel 110 by controlling the scraper(s) 122 via control of the first actuator 124, lift the packaging at the at least filling device 30 towards the at least one vessel 110 by controlling at least one lift 160, and fill the packaging with the food product by controlling the piston system(s) 132 via control of the at least one second actuator 134 (process 906), in accordance with embodiments of the present disclosure. The controller 40 may control the conveyor 20 to convey the packaging away from at least one filling device 30 after the packaging are filled (process 908), in accordance with embodiments of the present disclosure. According to embodiments, the processes 902-908 may be repeated any number of times. According to embodiments, one or more (e.g., some or all) of the processes 902-908 may be performed simultaneously with respect to different packaging.

According to embodiments of the present disclosure, filling devices and filling systems may be provided that can automatically fill packaging with a proper mixture of a food product that includes both a solid and a liquid.

According to embodiments of the present disclosure, the food product in the vessel may, for example, be a substantially non-homogenous mixture of the solid and liquid components, and the food product pushed into the packaging is the same or substantially the same non-homogenous mixture of the solid and liquid components as in the vessel.

According to embodiments of the present disclosure, the food product in the vessel has a weight ratio of solid to liquid of about 10:90 to about 90:10, and the food product pushed into the packaging has the same or substantially the same weight ratio as the food product in the vessel.

Embodiments of the present disclosure may achieve the advantages described herein. It should also be appreciated that various modifications, adaptations, and alternative embodiments thereof may be made within the scope and spirit of the present disclosure.

What is claimed is:

1. A filling device for filling packaging with a food product that includes a mixture of a solid and a liquid, the filling device comprising:
   a vessel configured to hold the food product;
   a first piston system configured to push a portion of the food product within the vessel through a first through hole in a bottom of the vessel, the first piston system comprising:
      a first piston; and
      a first sleeve that surrounds at least a portion of the first piston; and
   first actuators configured to independently actuate the first piston and the first sleeve such as to cause the portion of the food product to be pushed through the first through hole in the vessel.

2. The filling device of claim 1, wherein the first piston is directly above the first through hole and is configured to be actuated into the first through hole.

3. The filling device of claim 1, further comprising a first valve that is attached to the vessel such as to be communication with the first through hole of the vessel, the first valve configured to be selectively opened and closed to allow and disallow the food product from exiting the vessel at the bottom of the vessel.

4. The filling device of claim 3, wherein the first valve comprises:
   a filling nozzle that is configured to receive the food product;
   at least one body that is configured to open and close an opening in the filling nozzle; and
   at least one actuator configured to actuate the at least one body.

5. The filling device of claim 4, wherein the first piston is directly above the filling nozzle and is configured to be actuated into the filling nozzle.

6. The filling device of claim 1, wherein the first sleeve is a cylinder.

7. The filling device of claim 1, further comprising:
   a second piston system configured to push another portion of the food product within the vessel through a second through hole in the bottom of the vessel, the second piston system comprising:
      a second piston; and
      a second sleeve that surrounds at least a portion of the second piston,
   wherein the first actuators are configured to independently actuate the second piston and the second sleeve such as to cause the other portion of the food product to be pushed through the second through hole in the vessel.

8. The filling device of claim 7, wherein the first actuators comprise:
   a piston actuator configured to simultaneously actuate both of the first piston and the second piston in a vertical direction; and
   a sleeve actuator configured to simultaneously actuate both of the first sleeve and the second sleeve in the vertical direction.

9. A filling system comprising:
   the filling device of claim 1; and
   a controller configured to:
      control the first piston to move downwards from a raised position to a first lowered position;
      control, while the first piston is at or moving towards the first lowered position, the first sleeve to move downwards from the raised position to a second lowered position that is lower than the first lowered position; and
      control, while the first sleeve is at the second lowered position, the first piston to move to a third lowered position that is equal to or lower than the second lowered position,
   wherein a combination of the first piston at the first lowered position and the first sleeve at the second lowered position defines a predetermined volume that corresponds to a volume of the food product to be filled into the packaging.

10. The filling system of claim 9, wherein
    at the second lowered position, a bottom end of the first sleeve is adjacent to a floor of the vessel, and
    at the third lowered position, a bottom end of the first piston is below the first through hole.

11. The filling system of claim 9, wherein
    the filling device further comprises a first valve that is attached to the vessel such as to be communication with the first through hole of the vessel, the first valve configured to be selectively opened to allow and disallow the food product from exiting the vessel at the bottom of the vessel, and
    the controller is further configured to control the first valve to open while the first sleeve is at the second lowered position and before the first piston is at the third lowered position.

12. The filling system of claim 11, wherein
    at the second lowered position, the bottom end of the first sleeve is adjacent to a floor of the vessel, and
    at the third lowered position, the bottom end of the first piston is adjacent to or below a bottom end of a filling nozzle of the first valve.

13. The filling system of claim 12, wherein the controller is further configured to:
    control, after the first piston has reached the third lowered position, the first piston to move upwards out of the first valve; and
    control, after the first piston has moved out of the first valve, the first valve to close.

14. The filling system of claim 9, further comprising a conveyor configured to move packaging to a position below the vessel to receive the food product.

15. A method comprising:
    providing a food product into a vessel, the food product including a solid and a liquid;
    causing a portion of the food product to be pushed through a through hole in the vessel and into packaging, wherein the causing the portion of the food product to be pushed comprises:
       controlling a piston to move downwards from a raised position to a first lowered position within the vessel;
       controlling, while the piston is at or moving towards the first lowered position, a sleeve that at least partially surrounds the piston to move downwards from the raised position to a second lowered position that is lower than the first lowered position; and
       controlling, while the sleeve is at the second lowered position, the piston to move to a third lowered position that is equal to or lower than the second lowered position, such as to push the food product into the packaging,
    wherein a combination of the first piston at the first lowered position and the first sleeve at the second lowered position defines a predetermined volume that corresponds to a volume of the food product to be filled into the packaging.

16. The method of claim 15, wherein
at the second lowered position, a bottom end of the sleeve is adjacent to a floor of the vessel, and
at the third lowered position, a bottom end of the piston is below the through hole.

17. The method of claim 15, wherein
a valve is attached to the vessel such as to be communication with the through hole of the vessel, the valve configured to be selectively opened and closed to allow and disallow the food product from exiting the vessel at the bottom of the vessel, and
the causing the portion of the food product to be pushed further comprises controlling the valve to open while the sleeve is at the second lowered position and before the piston is at the third lowered position.

18. The method of claim 17, wherein
at the second lowered position, the bottom end of the sleeve is adjacent to a floor of the vessel, and
at the third lowered position, the bottom end of the piston is adjacent to or below a bottom end of a filling nozzle of the valve.

19. The method of claim 18, wherein the causing the portion of the food product to be pushed further comprises:
controlling, after the piston has reached the third lowered position, the piston to move upwards out of the valve; and
controlling, after the piston has moved out of the valve, the valve to close.

20. The method of claim 15, further comprising:
controlling a scraper, that is within the vessel, to move the food product towards the through hole.

* * * * *